(12) United States Patent
Oosawa et al.

(10) Patent No.: US 6,477,902 B1
(45) Date of Patent: Nov. 12, 2002

(54) CORIOLIS MASS FLOWMETER

(75) Inventors: Norikazu Oosawa; Kenichi Kuromori, both of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/697,998

(22) Filed: Oct. 25, 2000

Related U.S. Application Data

(62) Division of application No. 09/161,006, filed on Sep. 25, 1998.

(30) Foreign Application Priority Data

Sep. 30, 1997 (JP) .............................................. 9-265532
May 19, 1998 (JP) ........................................... 10-136680

(51) Int. Cl.$^7$ ................................................ G01F 1/84
(52) U.S. Cl. ............................. 73/861.355; 73/861.357
(58) Field of Search ..................... 73/861.357, 861.356, 73/861.355

(56) References Cited

U.S. PATENT DOCUMENTS 3,485,098 A * 12/1969 Sipin ..................... 73/861.355
4,823,614 A * 4/1989 Dahlin ................... 73/861.357
5,253,533 A * 10/1993 Lam et al. ............. 73/861.357
5,549,009 A * 8/1996 Zaschel ................. 73/861.355

* cited by examiner

Primary Examiner—Harshad Patel
(74) Attorney, Agent, or Firm—Moonray Kojima

(57) ABSTRACT

A Coriolis mass flowmeter comprising a vibration tube fixed to a housing at an upstream fixed point and a downstream fixed point and an original axis is taken as a straight line connecting these fixed points, wherein the vibration tube is operated so that the tube performs simple harmonic oscillation or circular motion on circumferences at predetermined distances away from each point on the original axis around the original axis take as a center. Since the vibration tube oscillates only in the circumferential planes at equal distances from the original axis, the length of the vibration tube does not vary regardless of the position of the tube. Thus, tensile force in the direction of the axis is always constant and leakage of vibration dued to variations in the force in the direction of the axis is eliminated. The enhanced isolation of vibration makes the vibration inside the flowmeter stable. Accordingly, a highly accurate and stable Coriolis mass flowmeter is achieved by the invention. Since the Q value of the internal vibration becomes high, the flowmeter is not easily affected by the vibration noise, consumes less power, and reduces zero and span changes due to changes in the amount of vibration leakage.

16 Claims, 30 Drawing Sheets

CORIOLIS MASS FLOWMETER

This is a division of Ser. No. 09/161,006 filed Sep. 25, 1998.

BACKGROUND OF THE INVENTION

1. Field of Invention

This invention relates to a Coriolis mass flowmeter whose stability, accuracy, and resistance to vibration are improved by enhanced isolation of internal vibration.

2. Description of the Prior Art

FIG. 1 shows a conventional mass flowmeter, such as disclosed in Japanese Unexamined Patent application Hei No. 6-109,512. The conventional flowmeter comprises a vibration tube 1 both ends of which are fixed to flanges 2. The flanges 2 are used to mount vibration tube 1 to a pipe A (not shown). An oscillator 3 is provided at the center of tube 1. Vibration sensors 4, 5 are provided on both sides of the center of vibration tube 1. The vibration tube 1 is fixed at both ends thereof in a housing 6. A measuring fluid is transmitted through tube 1 and oscillator 3 is caused to be driven by a means not shown.

Let the angular velocity of oscillator 3 in the direction of the vibration be [W] and the flow velocity of the measuring fluid be [V], then the following Coriolis force is produced:

$$Fc = -2\, m[w] \times [V], \text{ wherein m represents mass.}$$

Thus, by measuring the amplitude of vibration which is proportional to the Coriolis force, mass flow can be measured. Note, that the symbols enclosed within the brackets [ ] represent vector quantities.

FIG. 2 shows another conventional flowmeter which uses a two-tube configuration vibration tube 1.

Although the vibration tube 1 is fixed at both ends thereof in a one straight tube Coriolis mass flowmeter, such as shown in FIG. 1, for limited size flowmeters, the end points cannot be completely fixed and hence vibrate slightly.

One cause of vibration is as follows. If vibration tube 1, through which a measuring fluid is passed, is deformed as shown in FIG. 3 (which shows an approximately first order mode resonance state) since the length of the tube becomes longer due to deformation, a tensile force is generated in the direction of the axis of the vibration tube. For example, if the center part of the tube 1 (which is a stainless steel tube of diameter 9.6 mm, wall thickness of 0.91 mm, and length of 400 mm) is deformed by 1 mm, a tensile force of 7.5 kgf is generated in the axial direction, as shown in FIG. 3.

If tube 1 is oscillated in the first order resonance mode, the tensile force becomes maximum at the maximum positive and negative deformation and becomes minimum (i.e. zero) at the locations where there is no deformation. The tensile force reaches both its maximum and minimum two times in an oscillatory period. That is, the tensile force in the axial direction of tube 1 is generated at twice the frequency of the excitation frequency. If there is leakage of vibration due to this tensile force, that is there is insufficient isolation of vibration, the following problems arise.

1. Since the Q value becomes lower, the internal vibration becomes unstable and the flow meter is likely to be affected by un-wanted vibration noise other than noise caused by excitation oscillation.

2. A large amount of energy is needed for excitation so that power consumption is increased.

3. The extent of vibration leakage varies greatly depending on environmental changes and/or external causes, such as installation method, piping stress, temperature, etc. Thus, the vibration state of the tube also varies and the zero point and span are likely to change.

That is, conventional Coriolis flowmeters are likely to be made unstable, less resistant to vibration, and less accurate by the fore-going and other environmental changes and/or external causes. The conventional flowmeter shown in FIG. 2 is not likely to leak vibrations when using the tuning fork principle illustrate in FIGS. 4 and 5. This is because the forces cancel out each other at the branching points when there are two vibration tubes 1 vibrating in the opposite directions to each other. However, a structure having one vibration tube without branching points would still have the foregoing problems.

SUMMARY OF THE INVENTION

An object of the invention is to overcome the aforementioned and other deficiencies, disadvantages and problems of the prior art.

Another object is to provide a Coriolis mass flowmeter which has improved stability, accuracy, and resistance to vibration by enhancing isolation of internal vibration.

DETAILED DESCRIPTION OF THE PREFERRED EMBODIMENTS

Figure 1:
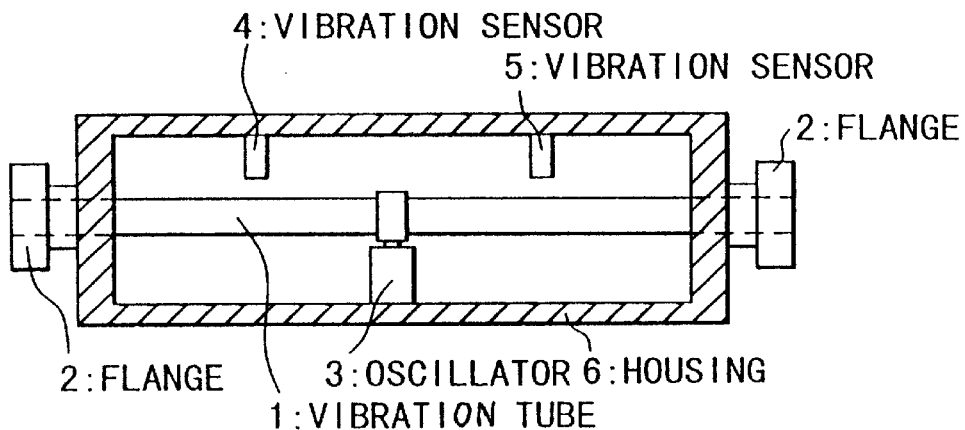
FIG. 1 is a cross sectional view depicting a conventional Coriolis mass flowmeter.
Figure 2:
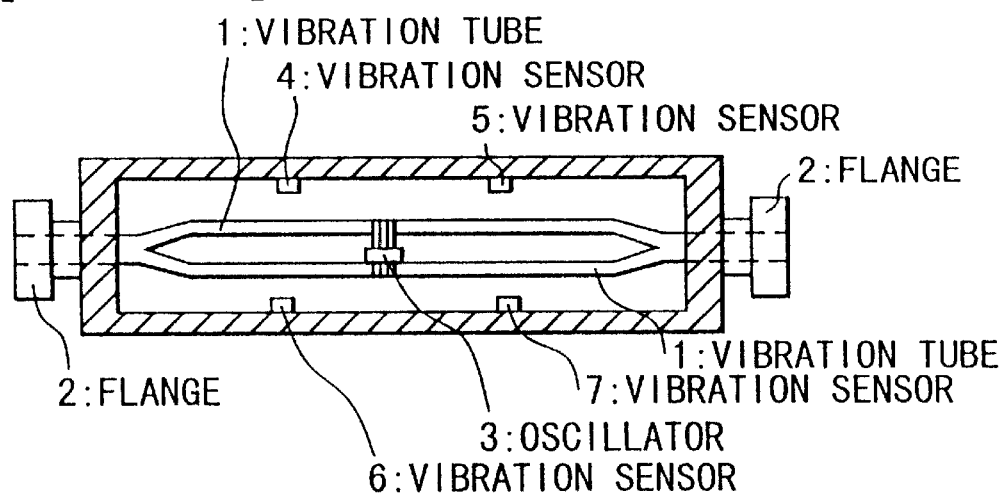
FIG. 2 is a cross sectional view depicting another conventional Coriolis mass flowmeter.
Figure 6:
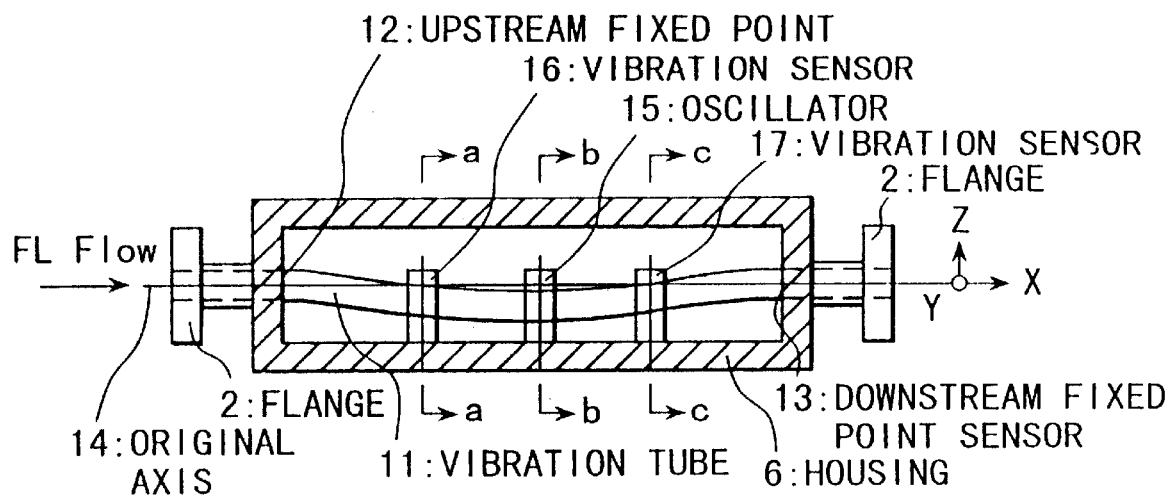
FIG. 6 is a cross sectional view depicting a first illustrative embodiment of the invention.

In FIG. 6, the same symbols as those in FIG. 1 represent the same functions; hence, only the portions different from those in FIG. 1 will be described hereat. FIG. 6 shows a Coriolis mass flow-meter comprising a vibration tube 11 which performs simple harmonic oscillation or circular motion on the circumferences at predetermined distances from each point on an original axis 15, which is a straight line connecting an upstream fixed point 12 and a downstream fixed point 13. An oscillator 15 is provided at the center of vibration tube 11.

Figure 7:
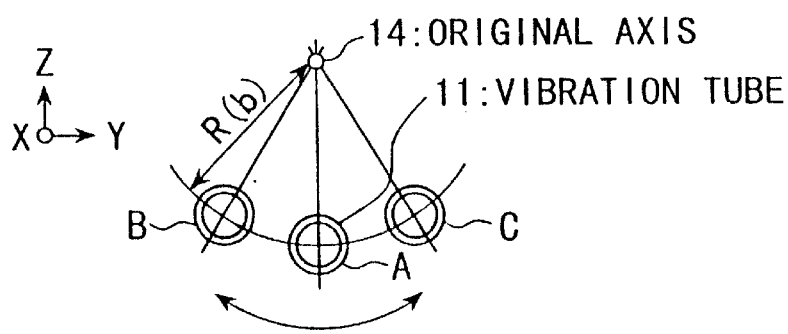
FIGS. 7, 8 and 9 are diagrams for explaining operation of the embodiment of FIG. 6.
Figure 8:
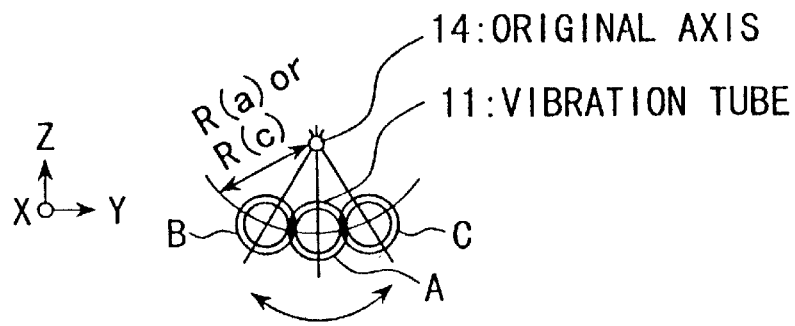
Figure 9:
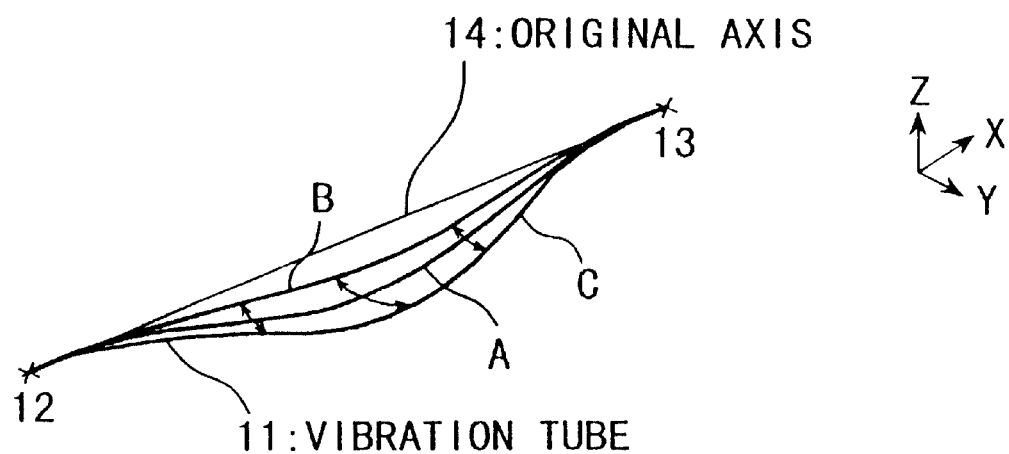

FIG. 7 is a cross sectional view taken along section line "b—b" of vibration tube 11 of FIG. 6. FIG. 8 is a cross sectional view taken along section line "a—a" or "c—c" of vibration tube 11 of FIG. 6. FIG. 9 is a perspective view which shows the state of vibration of vibration tube 11. In FIGS. 7 and 8, vibration tube 11 is located in the vicinity of position A when the tube 11 is in a non-excited state. When tube 11 is in an excited state, the axial line of the tube 11 moves on circumferences away from the original axis 15 by radius R(x). In the position of cross section "b—b", tube 11 is repeatedly oscillated in a pattern A→B→A→C→A→B→ on a circumference away from the original axis 14 by radius R(b), as shown in FIG. 7, and in the position of cross section "a—a" or "c—c", on a circumference away from original axis 14 by radius R(a) or R(c), as shown in FIG. 8. In FIG. 9 the symbols A, B and C correspond to each position of tube 11 in FIGS. 7 and 8, and numerals 12 and 13 indicate fixed points and number 14 indicates the original axis.

Since vibration tube 11 oscillates only in the circumferential planes at equal distances away from the original axis 14, the length of vibration tube 11 does not vary regardless of the position thereof. Accordingly, the tensile force in the axial direction is always constant. That is, the leakage of vibration due to the change in the axial force can be eliminated. Enhancing the isolation of vibration enables a highly accurate and stable Coriolis mass flowmeter to be achieved by the invention because vibration inside the flowmeter becomes stable. More specifically, since the Q value of the internal vibration becomes high, the flowmeter is not easily affected by the vibration noise. Thus, a Coriolis mass flowmeter is achieved by the invention which consumes less power, and reduces zero and span changes due to changes in amount of vibration leakage.

As a result, the following advantages are attained by the invention:

1. A Coriolis mass flowmeter which is immune to external vibration noise is obtained by the invention because the Q value of the internal vibration system can be increased, and even when external noise is applied, the influence of the noise is relatively low and the vibration is stable.

2. Since stable excitation can be implemented with less energy, a Coriolis mass flowmeter of low current consumption can be obtained by the invention.

3. When dissipation of vibration energy to the outside changes or the dissipation between the upstream side and the downstream side becomes unbalanced, the internal vibration system is ordinarily affected and the zero and span are changed thereby. But, advantageously, since the vibration is always confined internally in the invention, the foregoing influence or change can be disregarded. Thus, a highly accurate Coriolis mass flowmeter is obtained by the invention.

4. If the vibration tube 11 is bent to a predetermined shape (advance in a non-oscillated state, ambient temperature changes can be absorbed by the bent part and a Coriolis mass flowmeter having good temperature properties can be obtained by the invention in addition to the other advantages outlined herein. Also, a slight change in the bent part will not affect the output characteristics.

5. Furthermore, by simultaneously using two or more oscillators and changing the angles thereof, a Coriolis mass flowmeter that vibrates within the circumferential planes can be obtained by the invention.

(6) Also, by utlizing electromagnetic forces, a Coriolis mass flowmeter can be attained by the invention that can generate sufficient force even though the device is in a non-contact mode.

Figure 10:
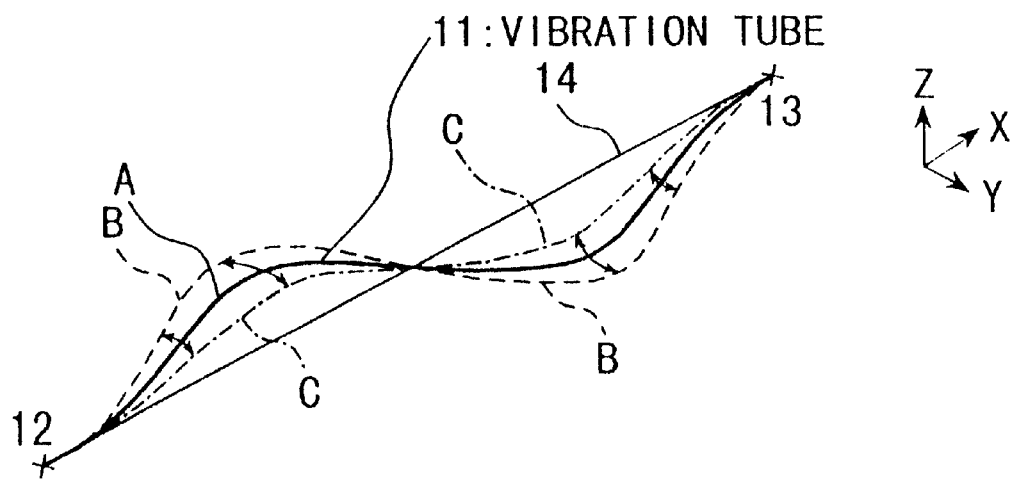
FIG. 10 is a perspective view depicting a second illustrative embodiment of the invention.

FIG. 10 shows a second illustrative embodiment wherein symbol "A" indicates shape of the vibration tube 11 in the vicinity of a fundamental position thereof in a non-excited state. Symbols "B" and "C" indicate the shape of the tube 11 in a maximum deformed state. Tube 11 oscillates in a second order oscillation mode (or in a third or higher order oscillation mode). A vibration node is located on original axis 14. Tube 11 oscillates on circumferences away from the original axis 14 by R(x).

For vibration detection and signal processing, the same processing as that for ordinary Coriolis mass flowmeters may be used. For example, one technique involves determining mass flow passing through the vibration tube by detecting the Y component of vibration using vibration sensors 16, 17, then determining the phase difference between the outputs of the two sensors, and then applying frequency and temperature corrections.

Figure 11:
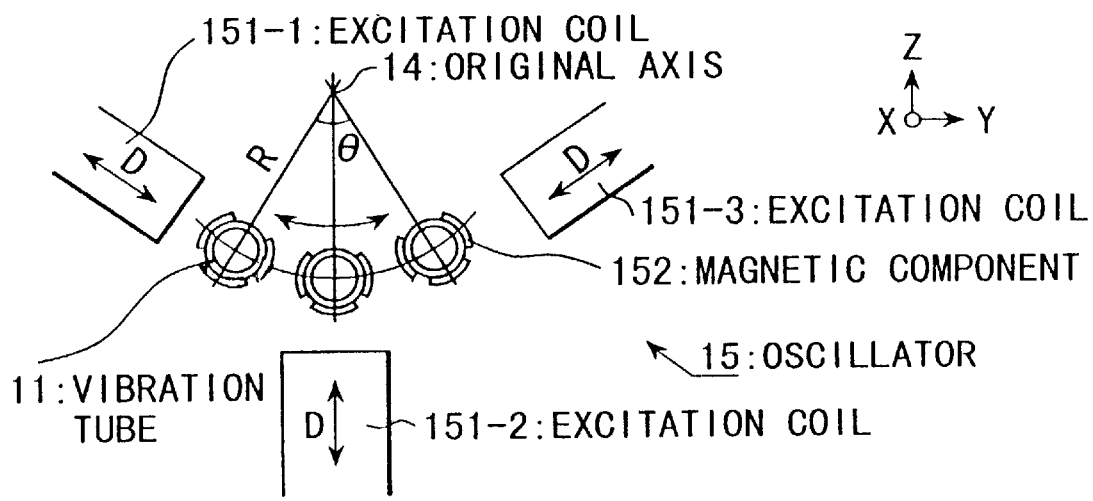
FIG. 11 is a diagram depicting a third illustrative embodiment of the invention.

FIG. 11 shows a third embodiment wherein a cross section of tube 11 and oscillator 15 correspond to FIG. 7. In this embodiment, oscillator 15 comprises three coils 151 and magnetic components 152 attached to tube 11. Permanent magnets may be used together to improve efficiency. Oscillator 15 generates forces in the direction of arrow D shown in coils 151. The three excitation coils 151 are arranged to generate forces in the directions that are mutually 120 degrees apart from each other.

In order to vibrate tube 11 along the circumferences, the following forces are generated between excitation coils 151-1,151-2, and 151-3, and magnetic components 152. In the case where the amplitude angle θ for vibration along the circumference is small, e.g. θ<π:

Coil 151-1:$F1=A \sin(wt+0)$

Coil 151-2:$F2=B \sin(2\ wt+\pi/2)+C=B \cos(2\ wt)+C$

Coil 151-3:$F3=A \sin(wt+\pi)=-A \sin(wt)$ wherein A, B and C are constants; w is angular velocity; and t is the time.

Forces are controlled in such a manner as detailed above and vibration tube 11 moves on the circumference away from the original axis 14 by radius R. As a result, the following advantages are attained:

1. A Coriolis mass flowmeter that can implement vibration within circumferences by simultaneously using two or more excitation coils 151 and by changing their angles, can be attained by the invention.

2. A Coriolis mass flowmeter that can generate sufficient forces using a non-contact method by using electromagnetic forces can be attained by the invention.

Figure 12:
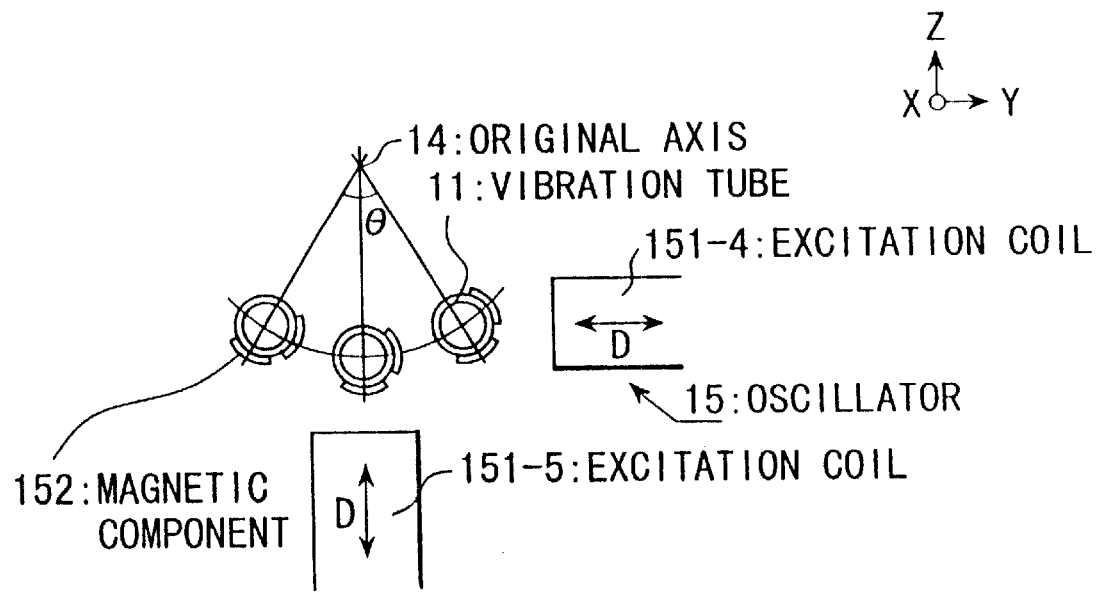
FIG. 12 is a diagram depicting a fourth illustrative embodiment of the invention.

FIG. 12 shows a fourth embodiment wherein two excitation coils 151-4 and 151-5 are mounted at an angle of 90° to each other. Oscillator 15 generates forces in the direction of arrow D shown in excitation coils 151-4 and 151-5. In the case of a small amplitude angle θ, the above forces are expressed as follows:

Coil 151-4:$F4=A \sin(wt+0)$

Coil 151-5:$F5=B \sin(2\ wt+\pi/2)=B \cos(2\ wt)$

Figure 13:
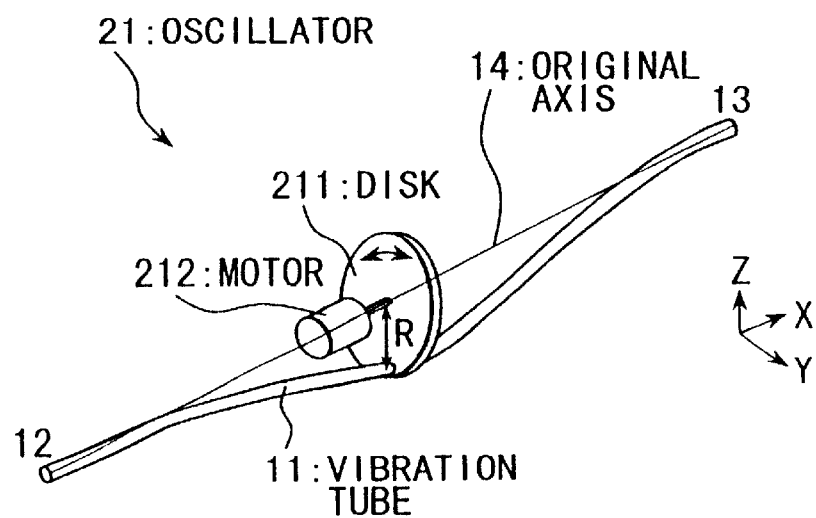
FIG. 13 is a perspective view depicting a fifth illustrative embodiment of the invention.

FIG. 13 shows a fifth embodiment wherein an oscillator 21 is provided comprising a rotating body 211 and a driving device 212 which drives the rotating body 211. Rotating body 211 moves along a part of a circumference or rotates around the center axis taken as original axis 14 with approximately the middle point of vibration tube 11 fixed to a position on rotating body 211 at a predetermined radius R distant from the center axis. The rotation of the rotating body 211 is carried out so that vibration tube 11 performs simple harmonic oscillation or circular motion.

In this case, motor 212, which rotates around the same axis as original axis 14, is provided oh original axis 14 and disk 211, as the rotating body, is attached to the shaft of motor 212. Disk 211 is connected to vibration tube 11, through which a measuring fluid passes, at a position away from original axis 14 by radius R. The rotating motor 21 moves vibration tube 11 on the circumference away from the rotation axis by radius R. If motor rotation is controlled to move along a part of the circumference, tube 11 performs simple harmonic oscillation on a circumference as shown in FIGS. 6 to 8.

Since an oscillator comprising rotating body 211 which rotates or moves along a circumference and a driving device 212 to drive the rotating body 211, is provided, a Coriolis mass flowmeter is achieved by the invention which can provide vibration within circumference planes with a simple mechanism and without complex control circuitry.

When a stepping motor is used, vibration can also be finely controlled. A very strong force can be generated depending on the system and oscillation in non-resonance states is also possible.

Figure 14:
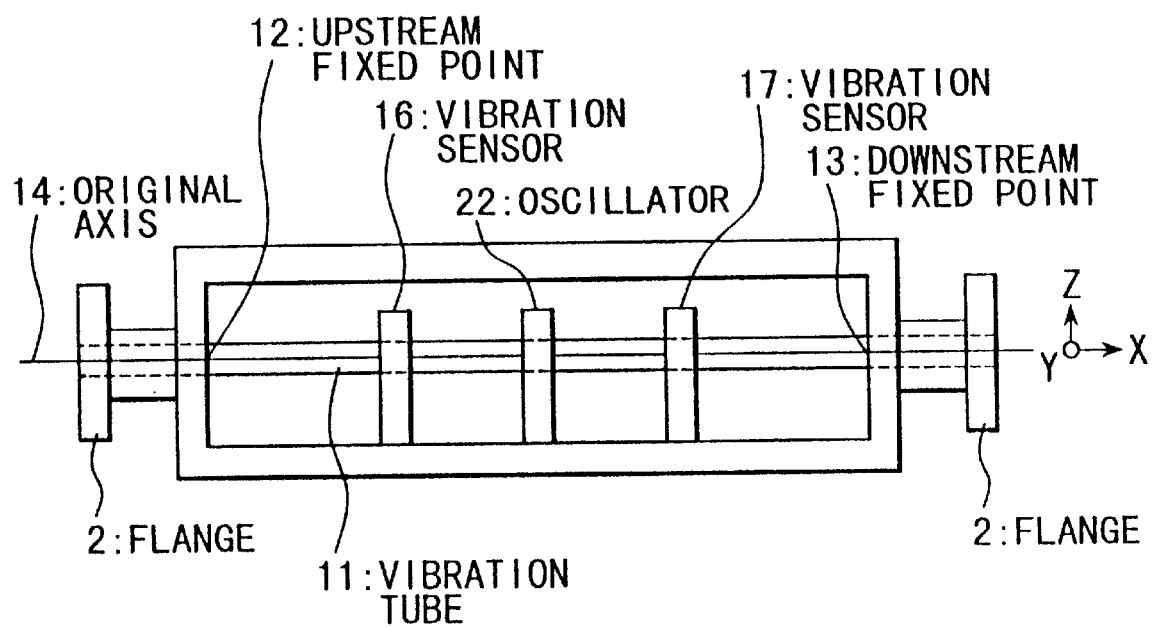
FIG. 14 is a cross sectional view depicting a sixth illustrative embodiment of the invention.
Figure 15:
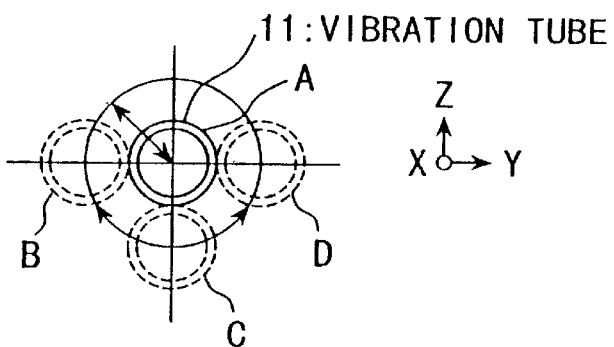
FIGS. 15 and 16 are diagrams for explaining operation of the embodiment of FIG. 14.
Figure 16:
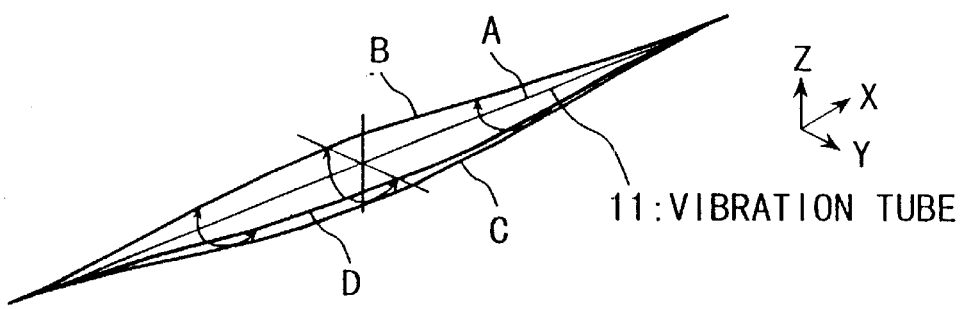

FIG. 14 shows a sixth embodiment with FIG. 15 showing operation of the embodiment and FIG. 16 showing conditions of vibration of tube 11 of the embodiment.

An oscillator 22 applies an oscillation component and a pre-determined bias component to tube 11 in an excited state so that tube 11 is located on circumferences away from each point of original axis 14 by predetermined distances in an excited state. Tube 11 is a straight tube in anon-excited state. In the initial state, tube 11 is located in position A of FIG. 15. The embodiment of FIG. 14 is a straight tube which exists in an initial state of non-excitation on the original axis 14.

Since a tensile bias component is added by the operation of oscillator 22, tube 11 moves to a position of radius R away from original axis 14. Tube 11 during excitation changes its position in the pattern B→C→D→C→B→C→. As a result, vibration tube 11 is in a completely symmetrical form in the Y and Z directions around original axis 14.

If the initial shape of the tube 11 in a non-excited state is non-symmetrical, it is difficult to achieve stable vibration within circumferential planes with a high Q value because the resonance frequencies of vibration in the Y and Z directions are slightly different.

In the embodiment of FIG. 14, since complete symmetry is obtained even when vibration is considered by dividing the vibration into components in each direction, a Coriolis mass flowmeter is attained by the invention wherein ideal vibration is produced within circumferential planes at a high Q value. In addition, when vibrations in the Y and Z directions are generated completely independently, a torsional component in the axial direction of vibration tube 11 can be eliminated even when vibration occurs steadily within a circumferential plane. If the torsional component is eliminated, it is no longer necessary to take measures to isolate the vibration due to that component. Since the vibration tube oscillation is symmetrical about the original axis, if the amount of oscillation is made large, a Coriolis mass flowmeter is obtained by the invention which easily achieves rotational motion around the original axis, not a simple harmonic oscillation.

Figure 17:
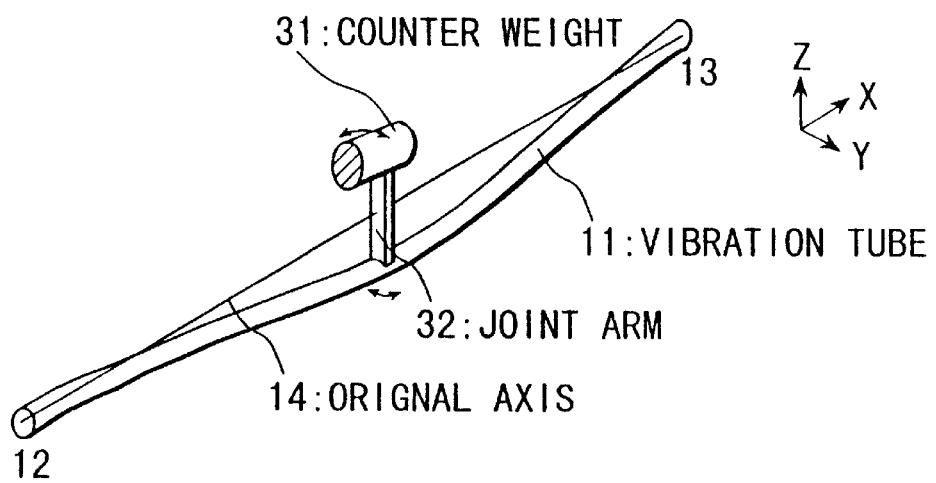
FIG. 17 is a perspective view depicting a seventh illustrative embodiment of the invention.
Figure 18:
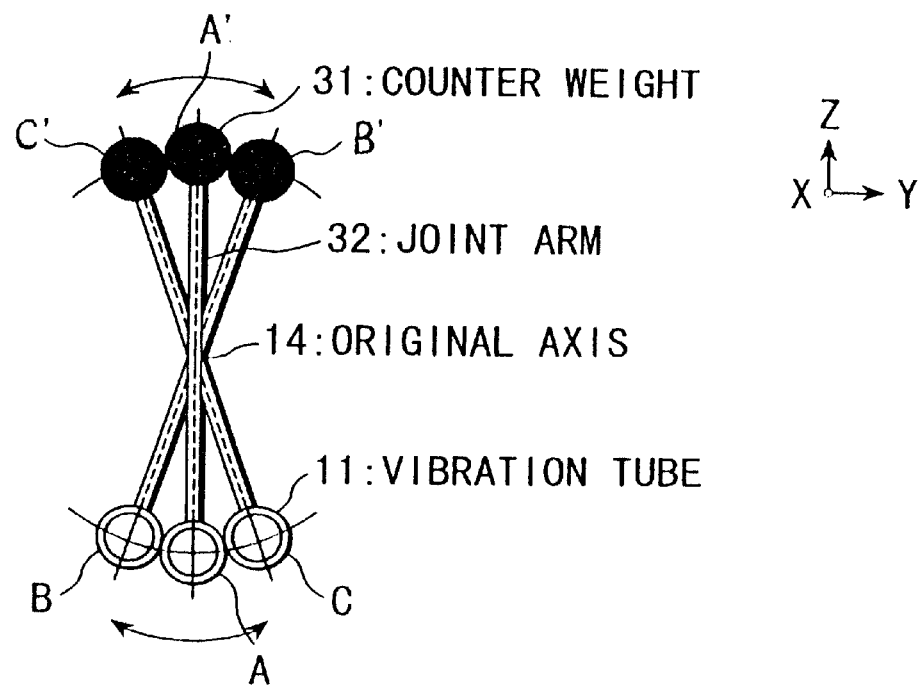
FIG. 18 is a cross sectional view of the embodiment of FIG. 17.

FIG. 17 shows a seventh embodiment, with FIG. 18 showing a Y-Z cross sectional view thereof, and wherein a counter weight 31 is joined with tube 11 in the opposite position of vibration tube 11 to original axis 14 so that the center of gravity of the entire vibration system comprising the tube 11 and oscillator 15, does not move when excited. In this case, the counter weight 31 is disposed near the center portion of tube 11 via joint arm 32.

When the vibration tube 11 moves on a circumference in the pattern B→A→C, the joint arm 32 and counter weight 31 move in the pattern B'→A'→C' like a pendulum around original axis 14. The position and mass of counter weight 31 are determined so that the center of gravity of the entire vibration system comprising tube 11, arm 32 and weight 31 does not cause positional changes on the original axis 14. As a result, since the center of gravity of the entire vibration system does not move, the entire flowmeter does not cause unwanted vibration. Thus, isolation of vibration is enhanced. By improving the isolation of the vibration, the vibration inside of the flowmeter becomes more stable. Thus, a highly accurate and stable Coriolis mass flowmeter is achieved by the invention.

Figure 19:
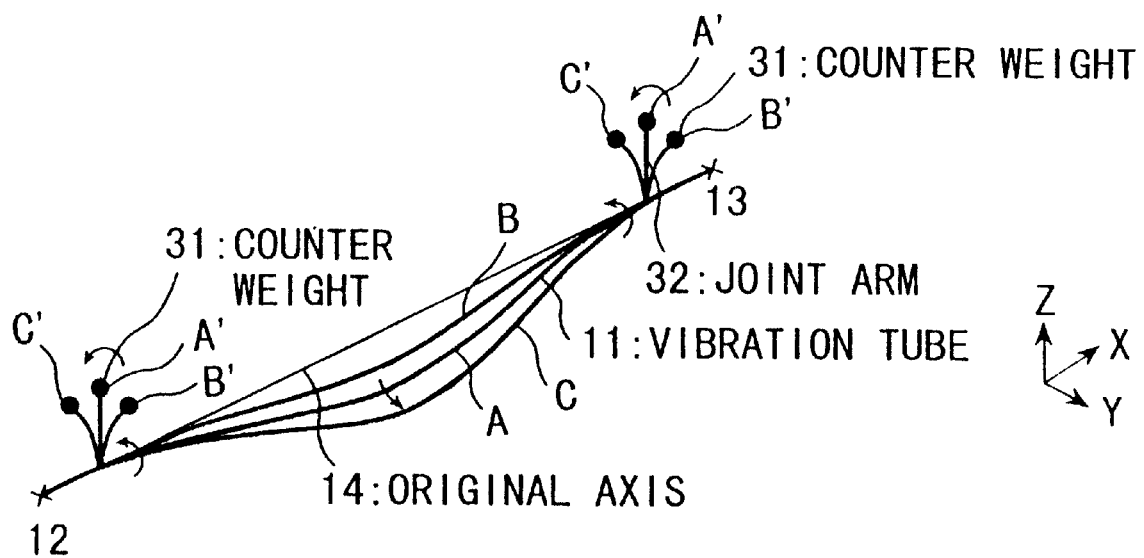
FIG. 19 is a diagram depicting an eighth illustrative embodiment of the invention.
Figure 20:
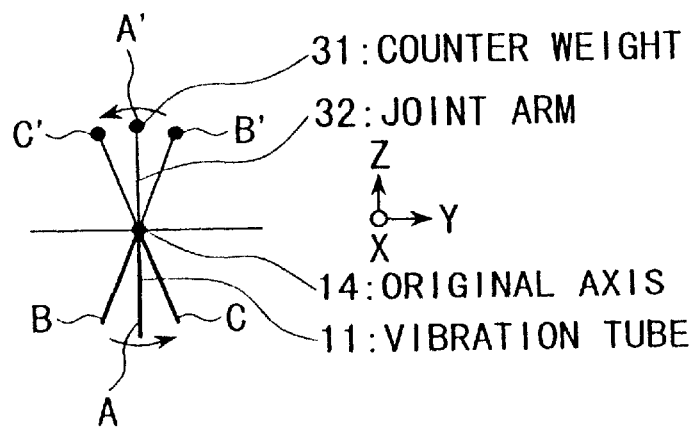
FIG. 20 is a side view of the embodiment of FIG. 19.

FIG. 19 shows an eighth embodiment with FIG. 20 showing a Y-Z cross sectional drawing thereof, and wherein counter weights 31 and joint arms 32 are provided in two places, on the upstream side and on the downstream side of vibration tube 11 through which the measuring fluid is transmitted. In FIG. 20, when the tube 11 moves in the pattern B→A→C, the counter weights 31 and joint arms move in:the pattern B'→A'→C'. Thus, counter weights 31 and joint arms 32 are disposed in places where vibration tube 11 is not too distant from the original axis and where torsional vibration is dominant over the transverse vibration. Accordingly, a Coriolis mass flowmeter can be easily achieved by the invention wherein the center of gravity of the tube 11 is not moved.

Figure 21:
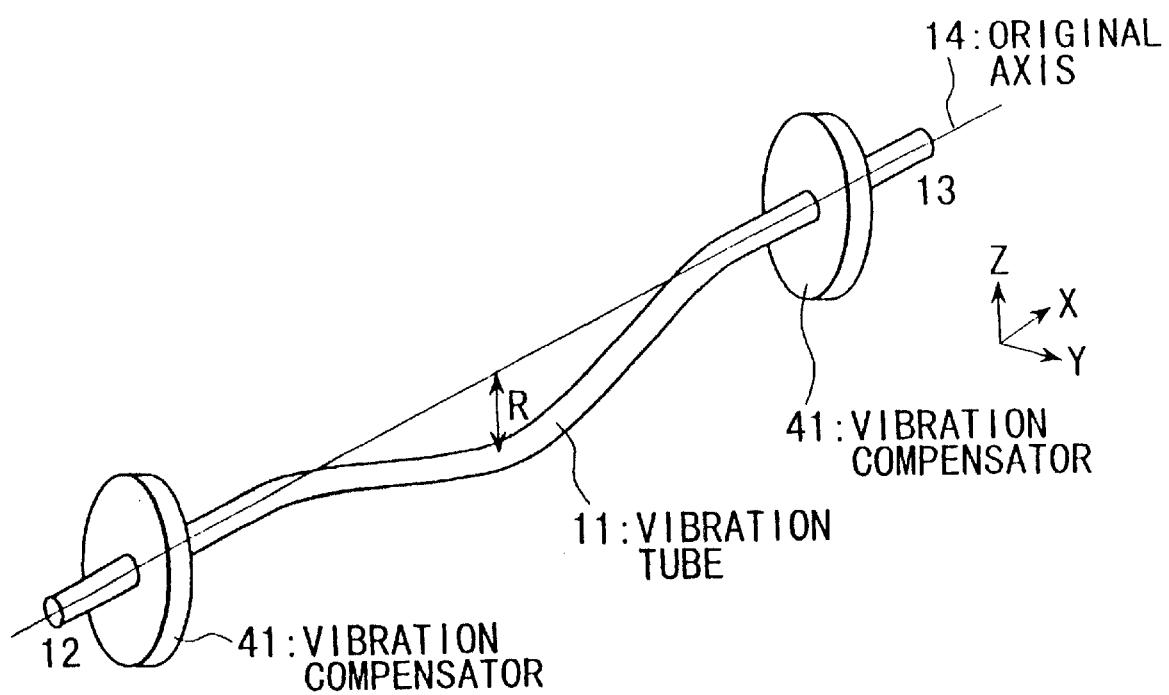
FIG. 21 is a perspective view depicting a ninth illustrative embodiment of the invention.
Figure 22:
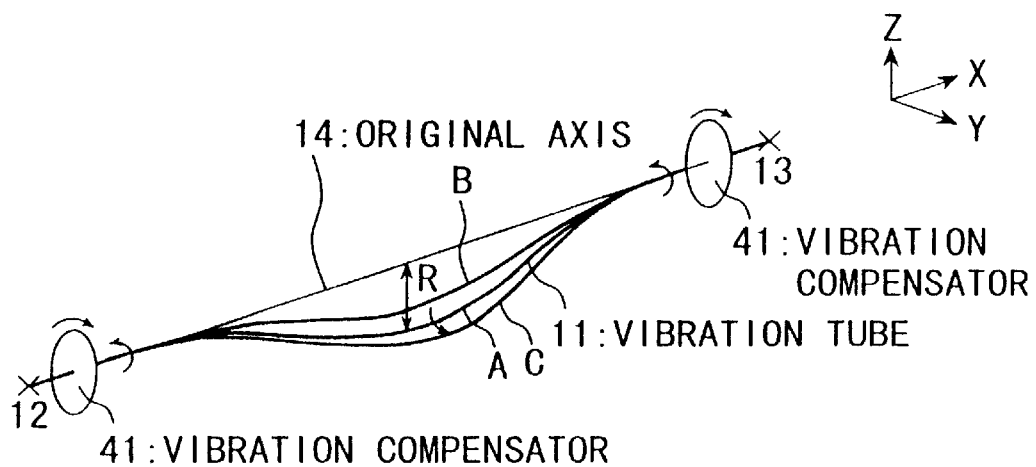
FIG. 22 is a drawing for explaining operation of the embodiment of FIG. 21.

FIG. 21 shows a ninth embodiment with FIG. 22 showing a diagram for explaining operation thereof, and wherein vibration compensators 41 are provided that cancel the rotational components generated around the original axis 14 and accompanied by vibration of the tube 11, and that construct vibration nodes in the vicinity of both fixed points of tube 11. In this embodiment, the vibration compensators are of a disk type and are joined to vibration tube 11 in the vicinity of both ends thereof. For vibration of tube 11, torsional vibration around the original axis 14 is dominant near the fixed points 12 and 13. By providing the compensators 41 in such a manner as to rotate in opposite direction to the torsional rotation, the vibrations cancel out each other, eliminate the vibration of tube 11 in the vicinity of the fixed points 12 and 13, and eliminated the leakage of vibration to the outside. Isolation of the vibration system from the outside is attained by the foregoing embodiment.

Since vibration compensators 41 are provided, the torsional component around the original axis 14 can be cancelled and isolation of vibration is enhanced by eliminating unwanted vibration leakage to the outside of the instant Coriolis mass flowmeter. By improving isolation of vibration, vibration inside a flowmeter becomes stable. Thus, a highly accurate and stable Coriolis mass flowmeter is obtained by the invention.

Figure 23:
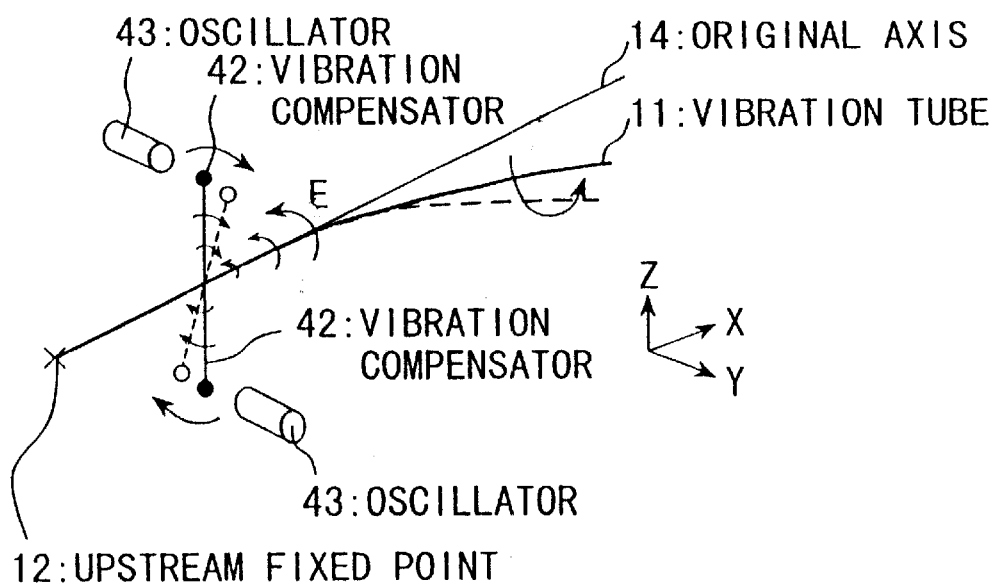
FIG. 23 is a diagram depicting a tenth illustrative embodiment of the invention.

FIG. 23 shows a tenth embodiment in a magnified drawing of the vicinity of upstream fixed point 12. In the embodiment, arm form vibration compensators 42 are provided. Oscillators 43, that forcibly generate vibration in the opposite direction of torsion of tube 11, may be provided for vibration compensators 42, as desired.

In the FIG. 23 embodiment, the lengths of arrow E indicate the sizes of the amplitudes. If vibration compensators 42 are designed so that the joint of vibration compensator 42 and vibration tube 11 becomes the node of the vibration, a Coriolis mass flowmeter can be attained by the invention, wherein vibration does not propagate to part of the tube 11 from the vibration compensators 42 to fixed point 12.

Figure 24:
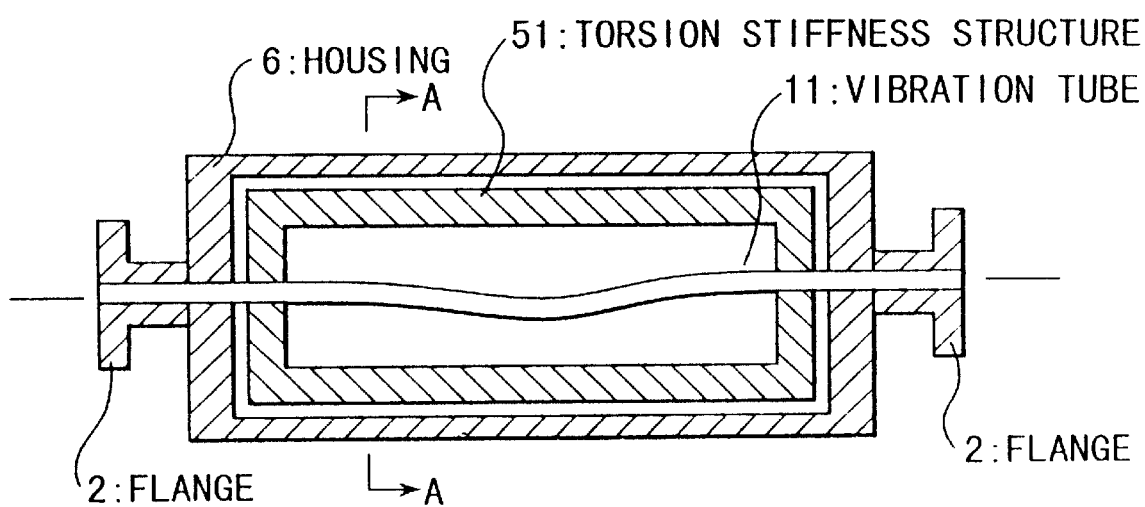
FIG. 24 is a cross sectional view depicting an eleventh illustrative embodiment of the invention.
Figure 25:
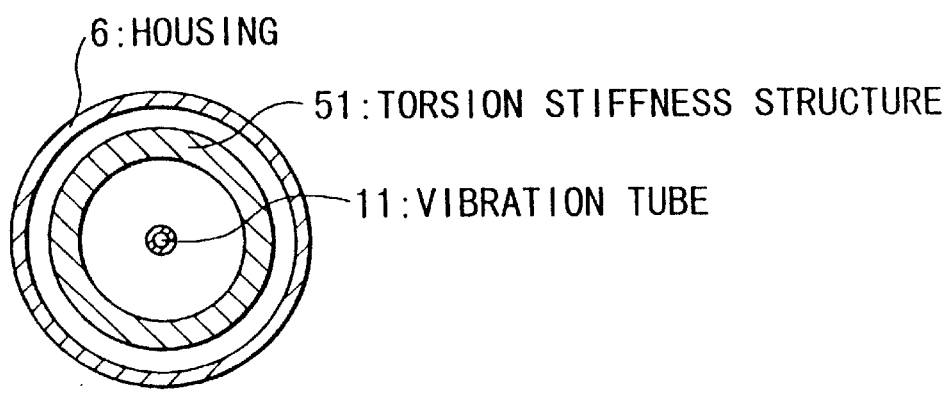
FIG. 25 is a cross sectional view of the embodiment of FIG. 24.

FIG. 24 shows an eleventh embodiment with FIG. 25 showing a cross sectional view thereof, and wherein a torsion stiffness structure 51 is connected to both fixed points of vibration tube 11 so that torsional vibration does not leak to the outside. In this case, the torsion stiffness structure 51, having a torsion stiffness around original axis 14 which is sufficiently large as compared to that of the tube 11, is mounted on tube 11. A sufficiently large torsion stiffness means that the stiffness is larger by an order of magnitude or more as a standard.

The torsion stiffness of a hollow circular shaft is defined as equal to $G \times \pi/32 \times (d_2^4 - d_1^4)$, wherein G is the Modulus of transverse elasticity, $d_2$ is the outer diameter, and $d_1$ is the inner diameter. As can be seen, the torsion stiffness is affected by a fourth power of diameter. Thus, a vibration system whose stiffness is larger by one order of magnitude or more than the existing system can be fabricated relatively easily by changing the diameter of the vibration tube 11 and the torsional stiffness structure 51, as shown in FIG. 25. As a result, providing a structure of sufficiently high torsion stiffness 51 enables the torsion component of the internal vibration system around the original axis 14 to be fixed rigidity and allow the Coriolis mass flowmeter to prevent torsional vibration from leaking to the outside. That is to say, that the vibration inside the flowmeter becomes more stable by isolating the vibration. Thus, a highly accurate and stable Coriolis mass flowmeter is attained by the invention.

Figure 26:
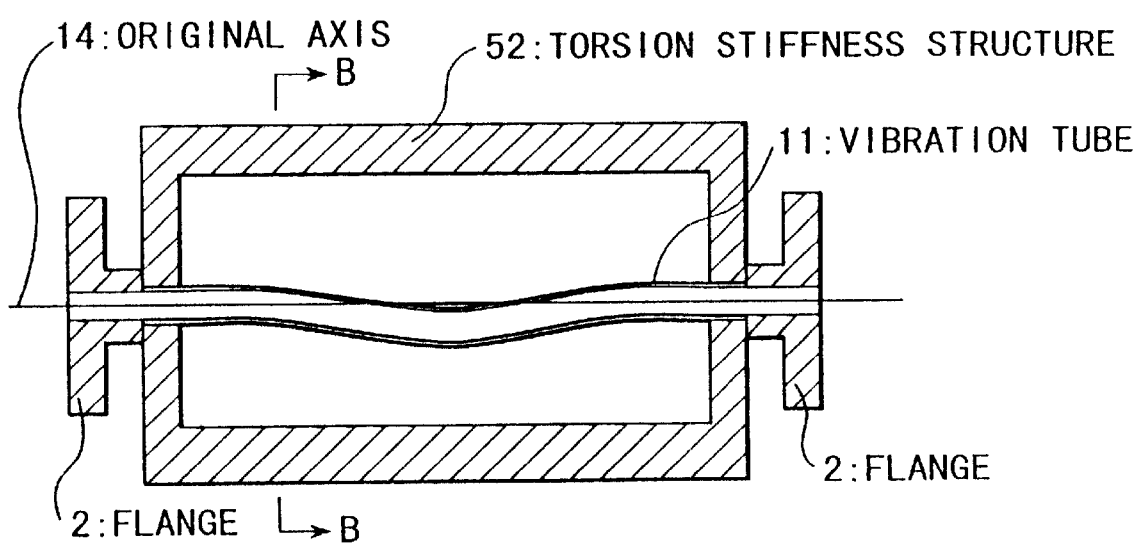
FIG. 26 is a cross sectiona view depicting a twelfth illustrative embodiment of the invention.
Figure 27:
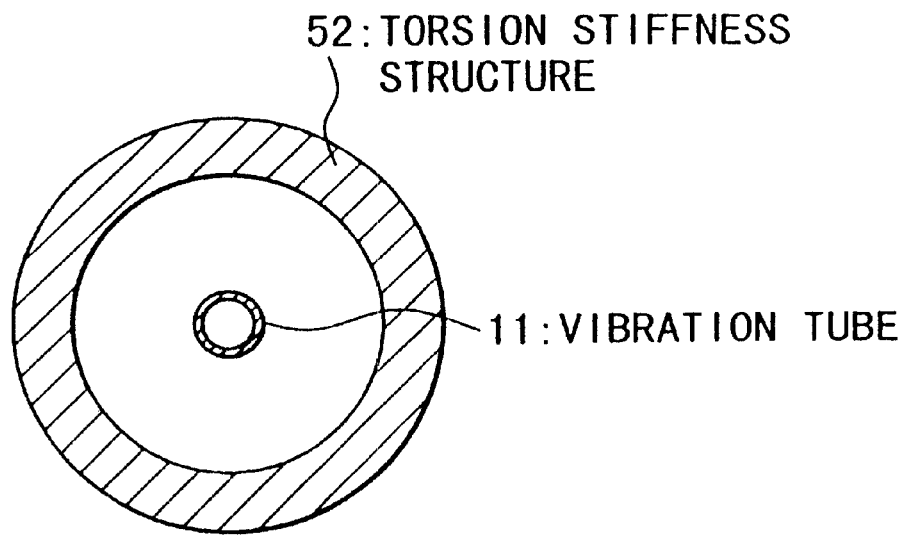
FIG. 27 is a cross sectional view of the embodiment of FIG. 26.

FIG. 26 shows a twelfth embodiment with FIG. 27 showing a cross sectional view thereof, and wherein a structure 52 is provided that is fabricated by integrating a large torsion stiffness structure 52 with a housing to construct a detector. This structure reduces the number of parts and hence a low cost Coriolis mass flowmeter is attained by the invention.

Figure 28:
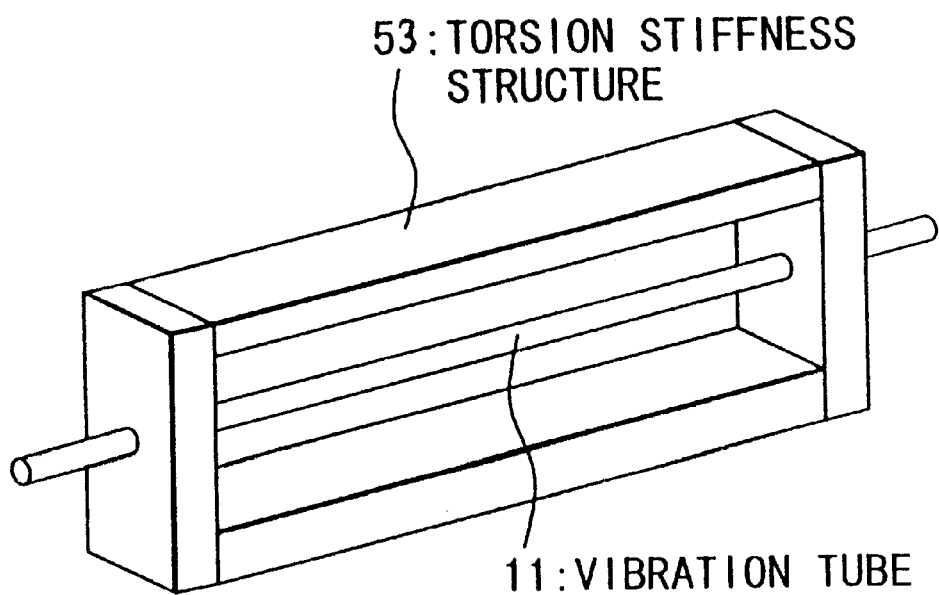
FIG. 28 is a perspective view depicting a thirteenth illustrative embodiment of the invention.

FIG. 28 shows a thirteenth embodiment wherein a structure 53 is provided having large torsion stiffness and comprising two rectangular solids. Since this configuration is not a double tube construction, a low cost Coriolis mass flowmeter is attained by the invention which is easy to manufacture. In addition, although structure 51 of FIG. 24 and 52 of FIG. 27 is described as a circular cylindrical tube, it is not limit thereto. A rectangular cylindrical tube may also be used. That is, it is sufficient that a structure be provided having a large torsion stiffness connected to both fixed points of tube 11 so that torsional vibration does not leak to the outside.

Figure 29:
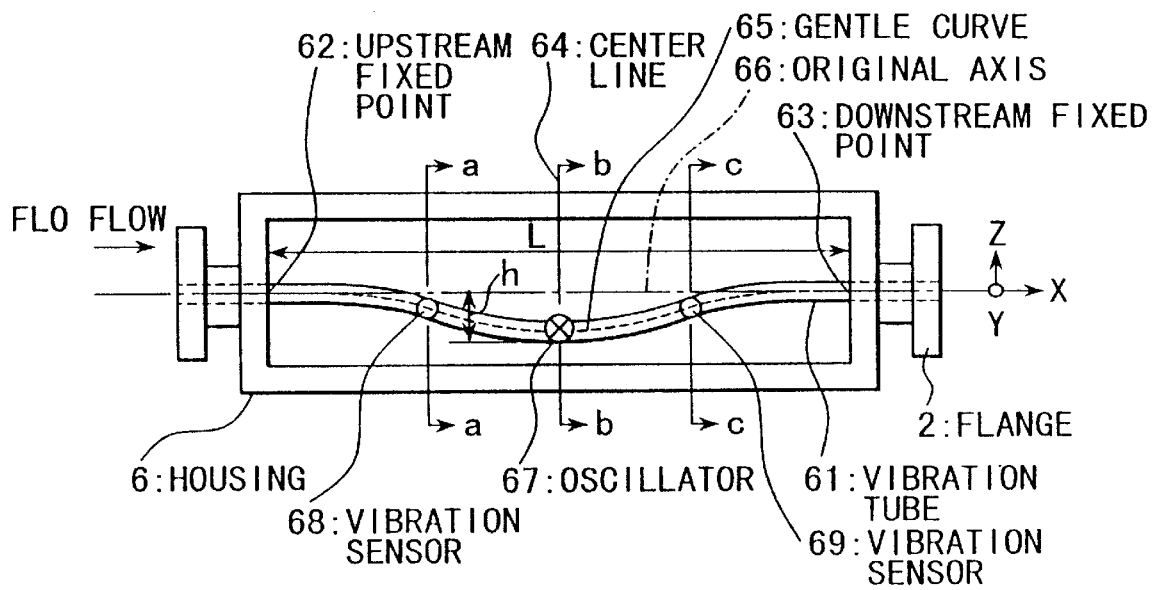
FIG. 29 is a cross sectional top view depicting a fourteenth illustrative embodiment of the invention.
Figure 30:
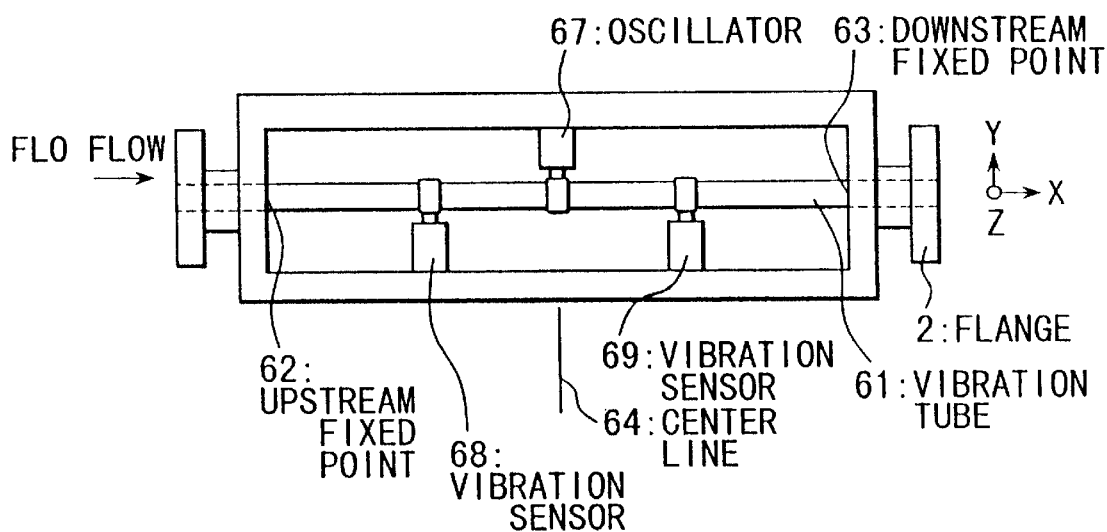
FIG. 30 is a cross sectional front view of the embodiment of FIG. 29.

FIG. 29 shows a fourteenth embodiment with FIG. 30 being a front view thereof and wherein the same symbols as those in FIG. 1 represent the same functions and hence only the portions which are different from those shown in FIG. 1 will be described hereat. Vibration tube 61 is line symmetrical about the center line 64 that is equally distant from an upstream fixed point 62 and a downstream fixed point 63. Original axis 66 is taken as a straight line connecting upstream fixed point 62 and downstream fixed point 63. Tube 61 consists of a single tube that has at least one gentle curve 65 and performs simple harmonic oscillation on circumferences which are at predetermined distances from each point of original axis 66.

In this embodiment, let the distance between upstream fixed point 62 and downstream fixed point 63 be "L" and the distance between the original axis 66 and the tube 61 be "h", then the shape of the vibration tube 61 should be that which satisfies the relation of approximately h≦0.2L. An oscillator 67 is provided at the center of vibration tube 61. Vibration sensors 68 and 69 are provided on the upstream side and the down stream side of tube 61, respectively.

Figure 31:
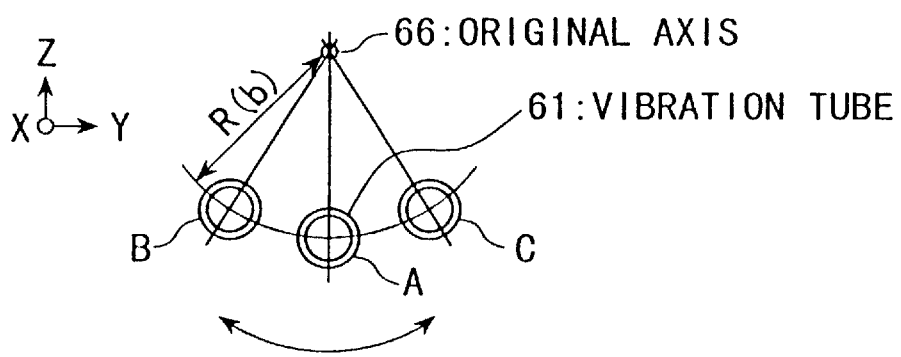
FIGS. 31, 32 and 33 are diagrams for explaining operation of the embodiment of FIG. 29.
Figure 32:
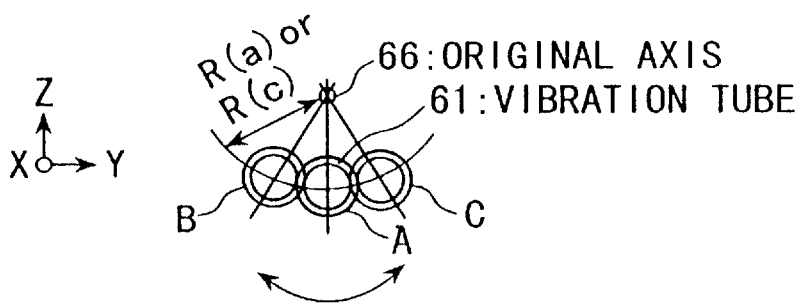
Figure 33:
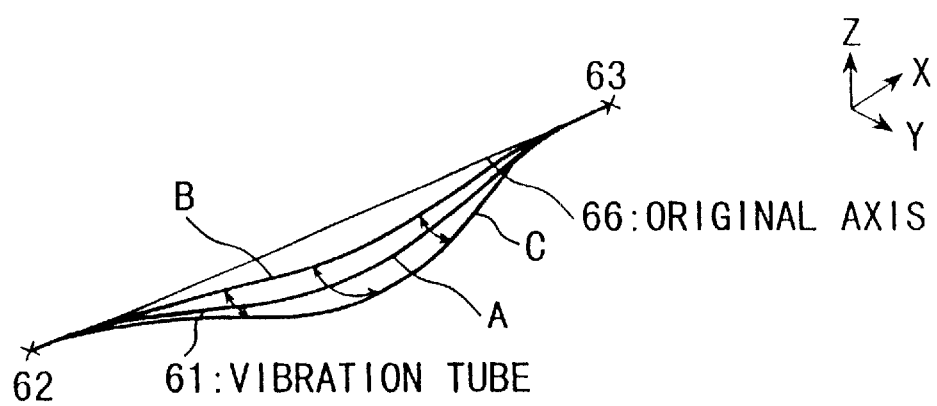

FIG. 31 is a cross sectional view taken along section line "b—b" of vibration tube 61 of FIG. 29. FIG. 32 is a cross sectional view taken along section line "a—a" or "c—c" of FIG. 29. FIG. 33 is a perspective view indicating the state of vibration of tube 61. In FIGS. 31 and 32, tube 61 is located in the vicinity of position A when the tube 61 is in a non-excited state. When vibration tube 61 is put in the excited state, the center of the tube moves on the circumference away from the original axis by radius R(x). In the position of cross section"b—b", the center part of tube 61 oscillates repeatedly in the pattern A→B→A→C→A→B→ on the circumference away from the original axis 66 by radius R(b). In the position of cross section "a—a" or "c—c", the tube 61 oscillates in the same-manner as above on the circumference away from the original axis 66 by radius R(a) or R(c).

Figure 3:
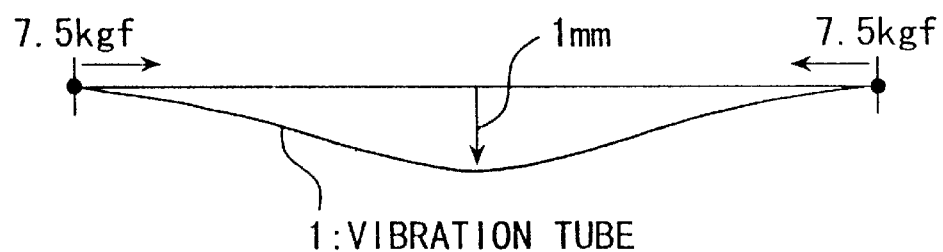
FIG. 3 is a diagram for explaining operation of the device of FIG. 1.
Figure 4:
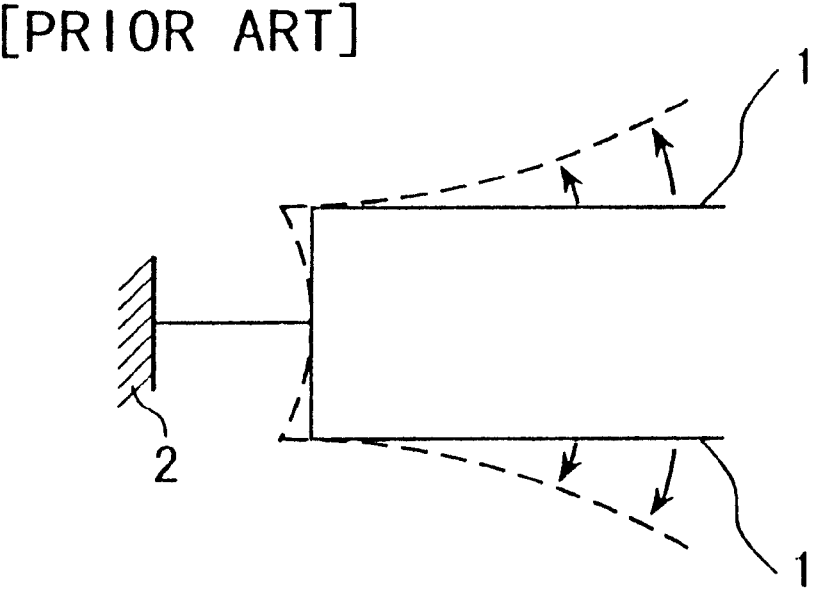
FIG. 4 and 5 are diagrams for explaining operation of the flowmeter, of FIG. 2.
Figure 5:
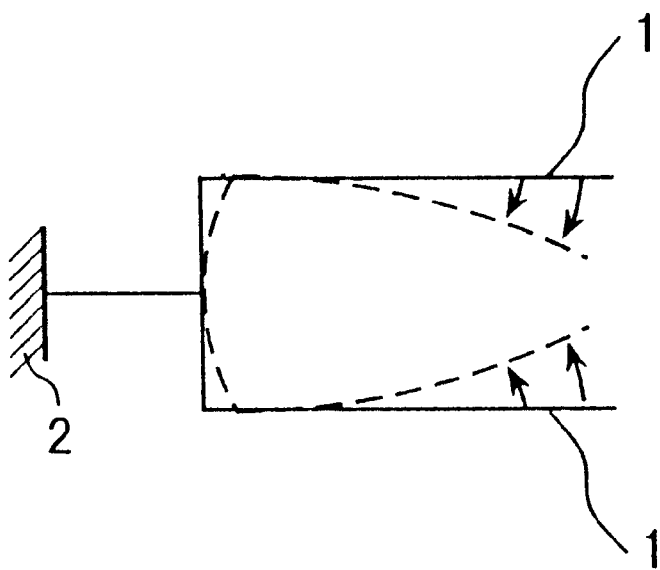

In FIG. 33, lines A, B and C correspond to each position of vibration tube 61 shown in FIGS. 31 and 32, numerals 62 and 63 show the fixed points and numeral 66 shows the original axis. The vibration detection and signal processing may be similar to those used in the ordinary Coriolis mass flowmeters. For example, mass flow passing through the tube can be determined by detecting the Y component of vibration using vibration sensors 68 and 69 of FIG. 3, then determining the phase difference between the outputs of the two sensors, and then applying frequency and temperature correction.

Since vibration tube 61 oscillates only within circumferential planes that are equi-distant from the original axis 66, the length of vibration tube 61 does not vary regardless, of the position of vibration tube 61. Accordingly, the tensile force in the axial direction is always constant. That is, the leakage of vibration due to variation in the force in the axial direction can be eliminated by the invention. The resulting enhancement of isolation of vibration makes the vibration inside the flowmeter stable. Thus, a highly accurate and stable Coriolis mass flowmeter is achieved by the invention. Specifically, since the Q value of the intgernal vibration becomes high, the flowmeter is not easily affected by the vibration noise. Thus, a Coriolis mass flowmeter is attained by the invention which consumes less power, and reduces zero and span changes due to changes in amount of vibration leakage. The enhanced isolation of vibration produces the following advantages:

1. A Coriolis mass flowmeter is attained by the invention which is immune to external vibration noise because the Q value of the internal vibration system can be made to be high. Even if external noise is applied, the influence of the noise is relatively low and vibration is stable.

2. Since stable excitation is implemented with less energy, a Coriolis mass flowmeter is achieved by the invention having low current consumption.

3. If dissipation of vibration energy to the outside changes or the dissipation of vibration energy between the upstream side and the downstream side becomes unbalanced, the internal vibration system will be affected and the zero and span are changed thereby. Since vibration is always confined internally in the invention, the foregoing influence or change can be disregarded. Accordingly, a highly accurate Coriolis mass flowmeter is achieved by the invention.

4. Since the vibration tube, through which a measuring fluid is transmitted, is of a one through tube construction without any branches or gaps between the inlet and the outlet thereof, a Coriolis mass flowmeter is attained by the invention which has low pressure loss, is hard to clog, and is easy to clean.

5. Since in this embodiment the vibration tube 61 may have a gentle curve 65 bent to a predetermined shape in a non-oscillated state, rather than a completely straight tube, and since ambient temperature changes are readily absorbed by the curved part 65, a Coriolis mass flowmeter is attained by the invention which has good temperature characteristics. That is, the invention flowmeter provides the concurrent advantages of both the straight tube type and the bent tube type of vibration tube by using a suitable curve for the vibration tube yet not a general purpose type bent tube nor a completely straight tube.

Vibration arms 71 and 72 are disposed to cross at right angles to the original axis 66 or vibration tube 61, respectively. In this case, the arms are disposed orthogonal to the original axis 66. Each end of the arms 71, 72 is fixed to vibration tube 61 and each of the other end of the arms 71, 72 is located on the opposite side of vibration tube 61 to original axis 66. However, in this case, the two arms 71, 72 are arranged in positions symmetrical to the center line 64.

Figure 34:
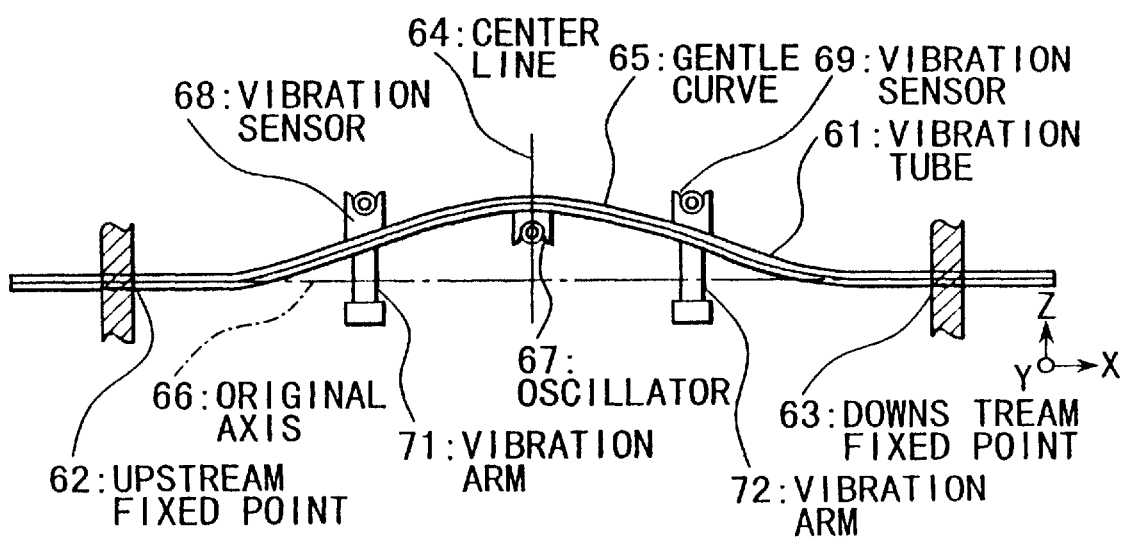
FIG. 34 is a diagram depicting a fifteenth illustrative embodiment of the invention.

As shown in FIG. 34, the vibration system has a shape that is line symmetrical in the X-axis direction. Center line 64 is a reference line for line symmetry; that is, the upstream fixed point 62 and the downstream fixed point 63, vibration tube 61, vibration sensors 68, 69 and vibration arms 71, 72, are located symmetrically about the center line 64. In this case, the center of gravity of the entire vibration system (comprising vibration tube 61, vibration sensors 68 and 69, oscillator 67, and vibration arms 71 and 72) is arranged on the original axis 66 by adjusting the mass distributions, and shapes of the vibration arms 71 and 72. That is, when the shapes and weights of the vibration tube 61, sensors 68, 69 and oscillator 67, are determined, then their total mass M and the position of the center of gravity (z being the Z coordinate of the position of the center of gravity) are determined.

More specifically, if the masses and shapes of arm; 71, 72 are adjusted to obtain their total mass "m" and the position of the center of gravity "z", the center of gravity of the entire vibration system will be located on the original axis 66 when the following relationship holds: $M \times Z = m \times z$. As a result, since the center of gravity of the entire vibration system is located on the original axis 66, abnormal action, such as a part which is located far away from the center of gravity vibrates abnormally, cannot easily occur even if external vibration noise or shock is applied to the vibration system. In addition even if the vibration system is adversely influenced, the adverse influence is symmetrical over the entire vibration system. Thus, the vitration system is likely to be affected relatively uniformily. Accordingly, even if the influence is not normal vibration, noise can be canceled out by detecting vibration at two points on the upstream side and on the down stream side of the tube 61. As a result it is shown that a stable and highly accurate Coriolis mass flowmeter, not easily affected by external vibration and/or shock can be achieved by the invention.

Figure 35:
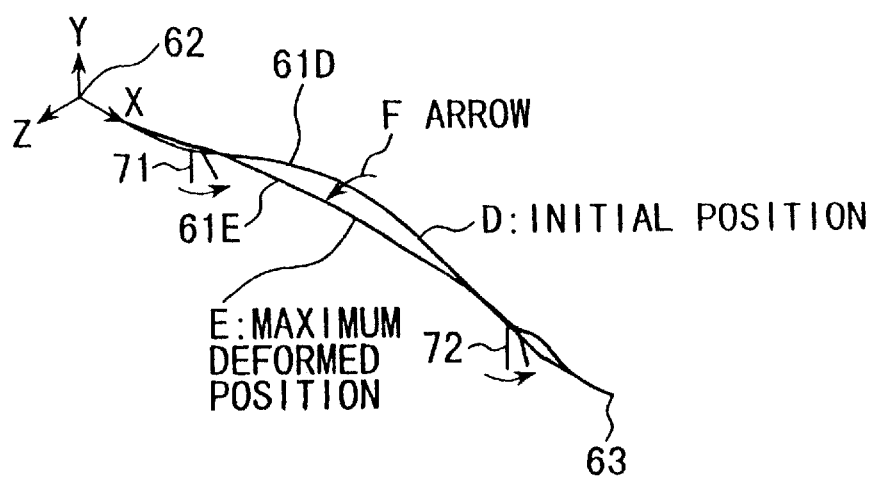
FIG. 35 is a perspective view depicting a sixteenth illustrative embodiment of the invention.
Figure 36:
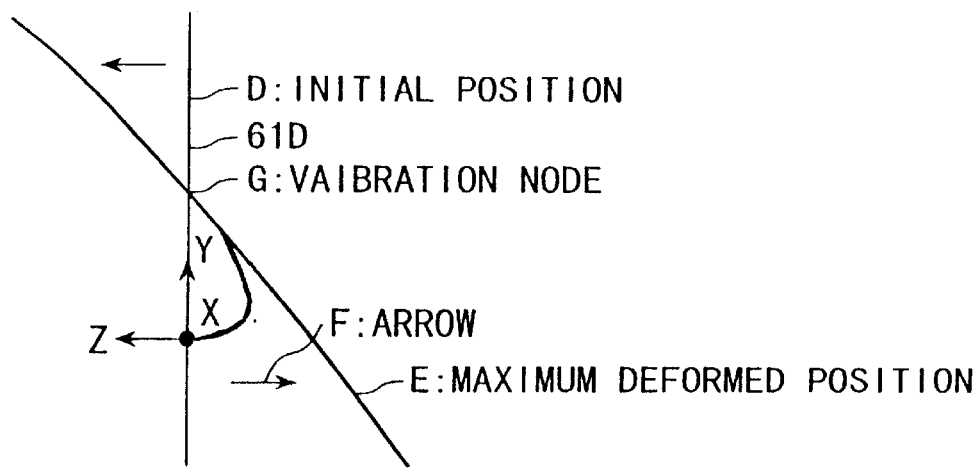
FIG. 36 is a projection diagram in the X direction of the embodiment of FIG. 35.
Figure 37:
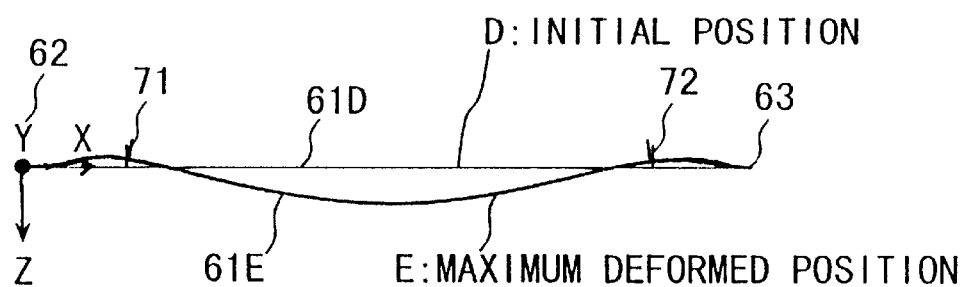
FIG. 37 is a projection diagram in the Y direction of the event of FIG. 35.
Figure 38:
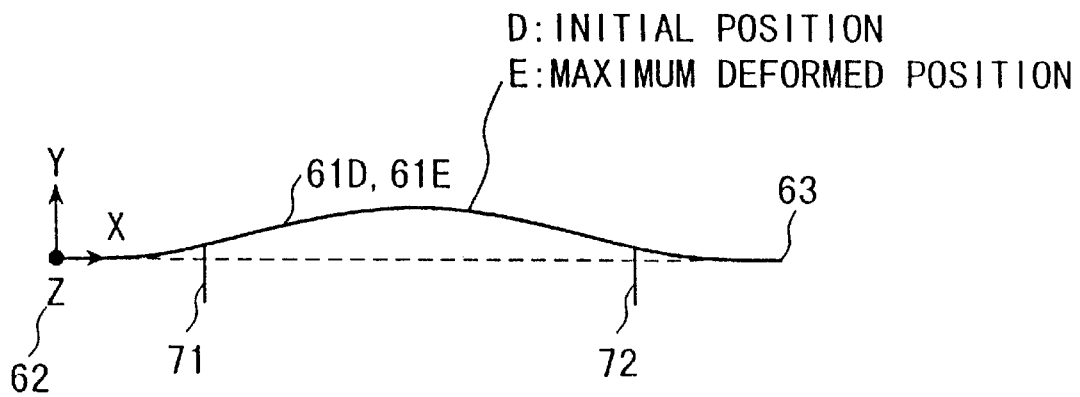
FIG. 38 is a projection diagram in the Z direction of the embodiment of FIG. 35.

FIGS. 35, 36, 37 and 38 show a sixteenth embodiment, wherein FIG. 35 is a perspective view of vibration tube 61; FIG. 36 is a projection drawing in the X direction of the embodiment of FIG. 3; FIG. 37 is a projection drawing in the Y direction of the embodiment of FIG. 35; and FIG. 38 is a projection drawing in the Z direction of the embodiment of FIG. 35. In FIGS. 35–38, both the shapes of tube 61D in initial position D and tube 61E in maximum deformed position E are shown. Vibration tube 61 and vibration arms 71, 72 deform from the intial position D to maximum positive deformed position E, as shown by arrow F in FIGS. 35–38, and return again to initial position D. Then, the tube 61 and arms 71, 72 deform to maximum negative deformed position E, which is symmetrical to maximum deformed psoition E about the XY plane, and then, return to the intial position D. The vibration system repeats such simple harmonic oscillation. In addition the analysis is a linear analysis when the amount of deformation is small. In FIGS. 35–38, the actual deformation is shown in magnified form for sake of clarity.

The embodiment is shown with the center of gravity of the entire vibration system being on vibration node G (see FIG. 36). The vibration system comprises vibration tube 61, vibration sensors 68, 69 and vibration arms 71, 72 and oscillator 67). This is done by adjusting the mass distributions, shapes and stiffness of vibration tube 61 and vibration arms 71, 72 and the distance between the vibration arms. The configuration used to explain this embodiment is similar to that shown in FIG. 34. In the position of vibration node G, the vibration system generates a rotational component around the X-axis but the position of node G does not move, that is coordinates X, Y and Z do not change. If the shape of the tube 61 is determined in advance, the center of gravity of the entire vibration system can be locatd on vibration node G by adjusting the weights of the vibration arms 71 and 72. The position of vibration node G depends on the mounting positions of the vibration arms 71 and 72. In general, when the vibration arms 71 and 72 are disposed toward the center (or if the arms 71, 72 are integrated to one center arm), vibration node G is located toward the positive side of the Y axis as shown in FIG. 39, 40, 41 and 42.

Figure 39:
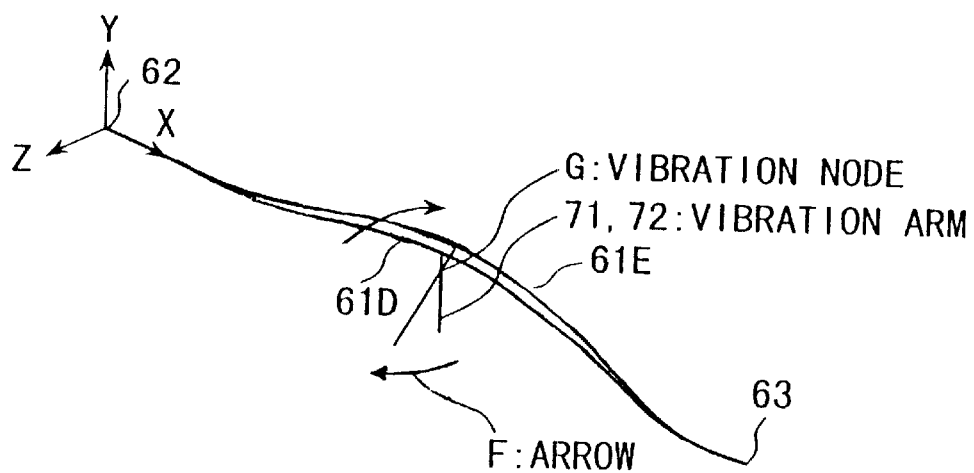
FIG. 39 is a perspecive view for explaining further operation of the embodiment of FIG. 35.
Figure 40:
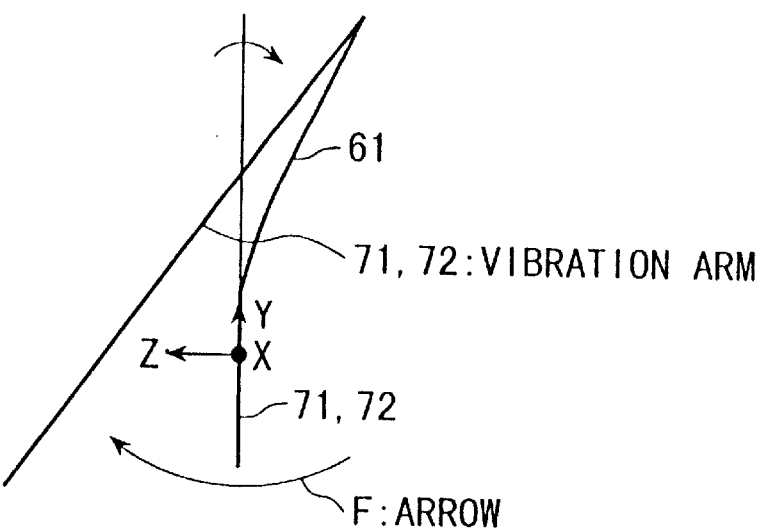
FIG. 40 is a projection diagram in the X direction of the embodiment of FIG. 39.
Figure 41:
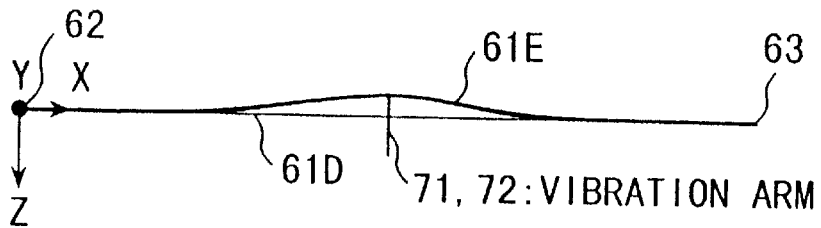
FIG. 41 is a projection diagram in the Y direction of the embodiment of FIG. 39.
Figure 42:
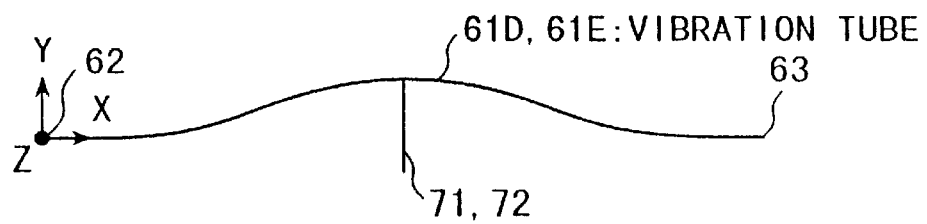
FIG. 42 is a projection diagram in the Z direction of the embodiment of FIG. 39.

FIGS. 39, 40, 41 and 42 show the results of modal analysis using a finite element method with beam element, wherein FIG. 39 is a perspective view of the embodiment of FIG. 35; FIG. 40 is a projection drawing in the X direction of the embodiment of FIG. 39; FIG. 41 is a projection drawing in the Y direction of the embodiment of FIG. 39; and FIG. 42 is a projection drawing in the Z direction of the embodiment of FIG. 39. In FIGS. 39–42, both vibration tube shapes are shown, namely, 61D in the initial position D and 61E in the maximum deformed position E.

Figure 43:
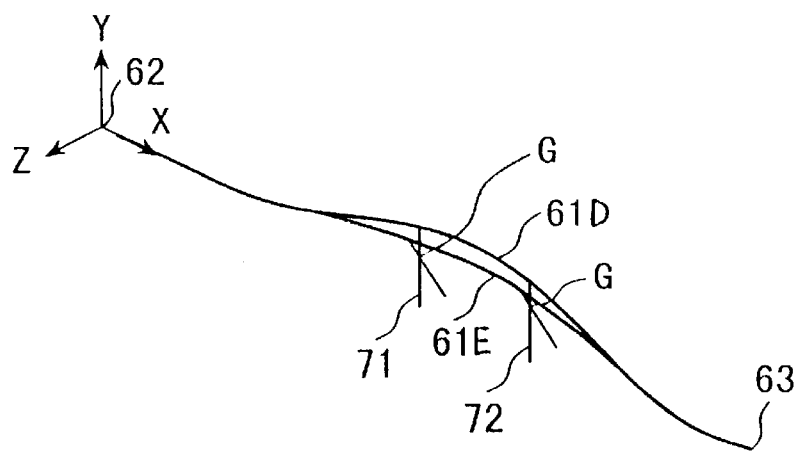
FIG. 43 is a perspective view for explaining another operation of the embodment of FIG. 35.
Figure 44:
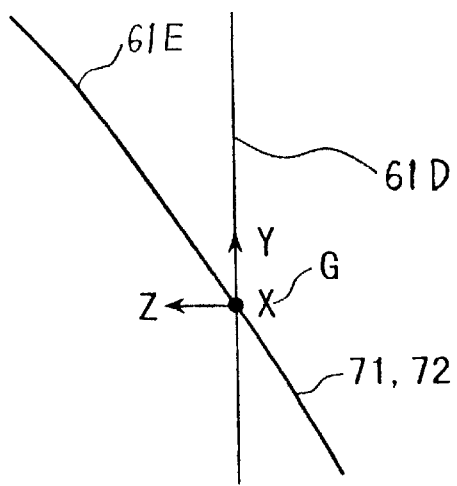
FIG. 44 is a projection diagram in the X direction of the embodiment of FIG. 43.
Figure 45:
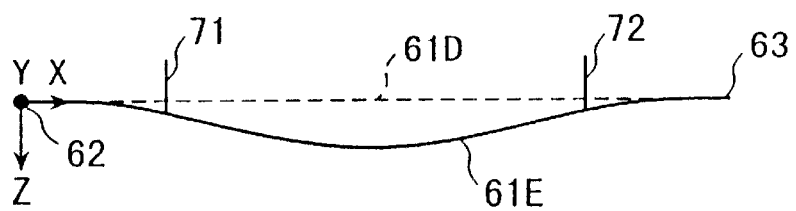
FIG. 45 is a projection diagram in the Y direction of the embodiment of FIG. 43.
Figure 46:
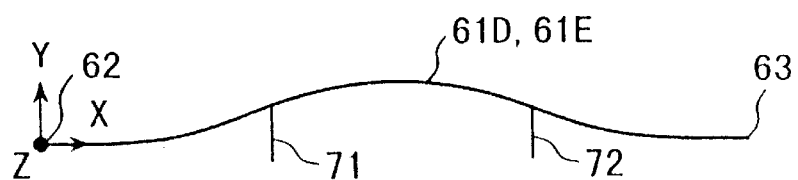
FIG. 46 is a projection diagram in the Z direction of the embodiment of FIG. 43.

If the vibration arms 71, 72 are adjusted to appropriate values, as shown in FIGS. 43–46, vibration node G can be positioned on the original axis 66. FIGS. 43–46 show the results of modal analysis using the finite element method with beam elements, wherein FIG. 43 is a perspective view of the embodiment of FIG. 35, FIG. 44 is a projection drawing in the X direction of the embodiment of FIG. 43, FIG. 45 is a projection drawing in the Y direction of the embodiment of FIG. 43, and FIG. 46 is a projection drawing in the Z direction of the embodiment of FIG. 43 In FIGS. 43–46, two vibration tube shapes are shown, namely, 61D in the initial position D, and 61E in the maximum deformed position E.

The foregoing results are produced because the intersections of vibration arms 71 and 72 with the Y axis are positioned on the positive side of the Y axis. This is because vibration tube 61 has a large deformation angle around the original axis 66 in the vicinity of the center thereof, and because the Y coordinated values of the points whereat vibration arms 71 and 72 are connected to tube 61 are large. Thus, it is also because the deformation angles of arms 71 and 72 connected to the tube 61 becomes large. For these reasons, in order to provide the center of gravity on original axis 66 and also on vibration node G, the provision of one vibration arm at the center is not sufficient. It becomes necessary to provide two symmetrical upstream and downstream vibration arms 71 and 72. This eliminates useless vibration and enhances isolation of vibration because the center of gravity of the entire vibration system does not move. As described, the enhanced isolation of vibration produces the following advantages:

1. A Coriolis mass flowmeter immune to external vibration noise can be attained by the invention because the Q value of the internal vibration system can be made high, and even when external noise is applied, the influence of the noise is relatively small and vibration is stable.

2. Since stably excitation is implemented with less energy, a Coriolis mass flowmeter is attained by the invention wherein low current consumption is obtained.

3. If dissipation of vibration energy to the outside changes or the dissipation between the upstream side and the downstream side of the tube 61 becomes unbalanced, the internal vibration system is affected and the zero point and span are changed thereby. Since vibration is always confined internally in the invention, the foregoing influence or changes can be disregarded and a highly accurate Coriolis mass flowmeter can be achieved by the invention.

4. Even if the normally received noise and shock in the transverse direction are applied and the center of gravity undergoes transverse motion, vibration caused by such noise and/or shock can be easily identified from the mode form and frequency because the motions thereof are different from ordinary oscillating vibration. Accordingly, a stable and highly accurate Coriolis mass flowmeter can be obtained by the invention which is not easily affected by external vibration and/or shock.

Figure 47:
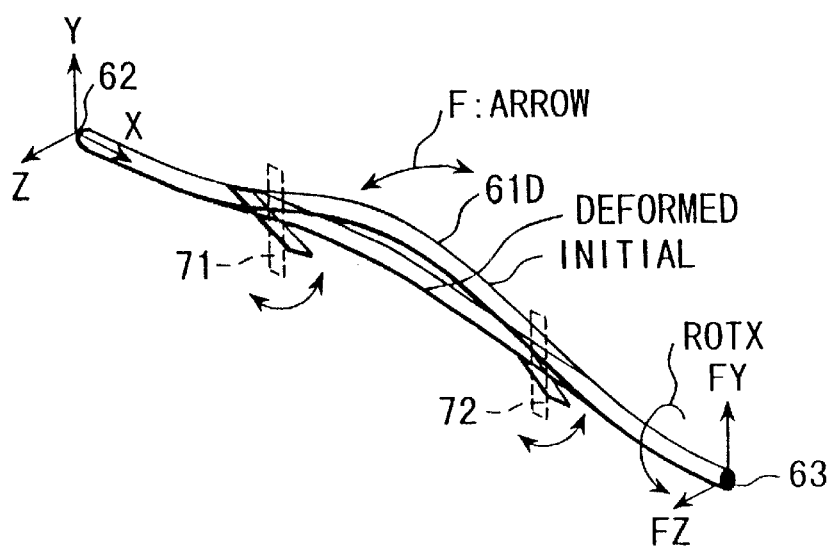
FIG. 47 is a perspective view depicting a seventeenth illustrative embodiment of the invention.
Figure 48:
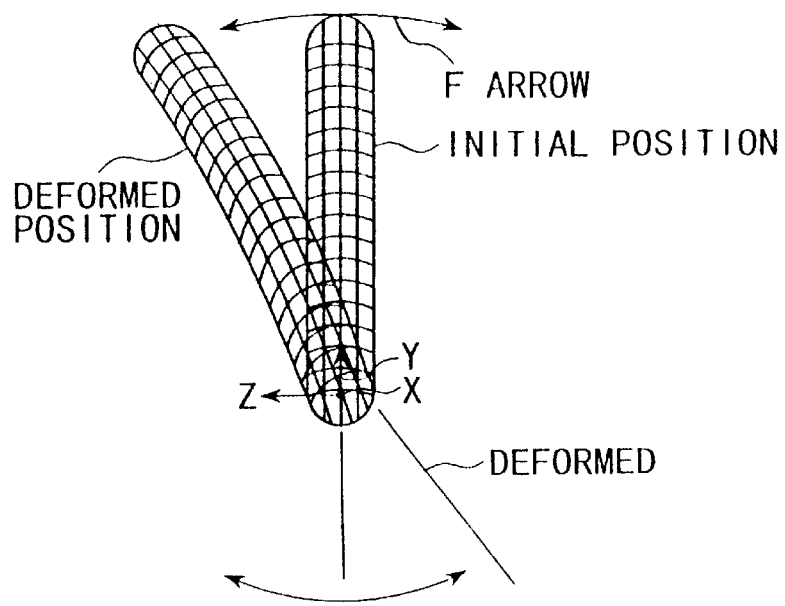
FIG. 48 is a projection diagram in the X direction of the embodiment of FIG. 47.
Figure 49:
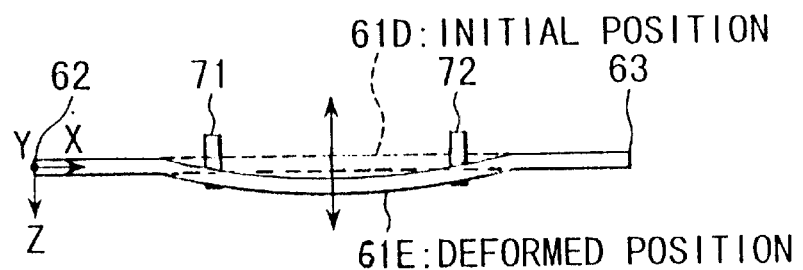
FIG. 49 is a projection diagram in the Y direction of the embodiment of FIG. 47.
Figure 50:
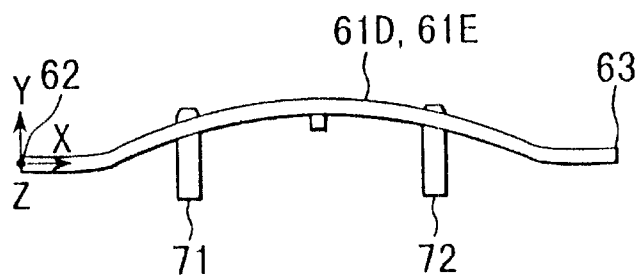
FIG. 50 is a projection diagram in the Z direction of the embodiment of FIG. 47.

FIGS. 47–50 show a seventeenth embodiment wherein are shown the results of modal analysis using a finite element method with shell elements and wherein the configuration used for describing the embodiment is similar to that shown in FIG. 34. FIG. 47 shows a perspective view of the embodiment; FIG. 48 shows a projection drawing in the X direction of the embodiment of FIG. 47; FIG. 49 shows a projection drawing in the Y direction of the embodiment of FIG. 47; and FIG. 50 shows a projection drawing in the Z direction of the embodiment of FIG. 47. FIGS. 47–50 shows both vibration tube shapes, namely, 61D in the initial position D, and 61E in the maximum deformed position E.

As shown with arrow F, vibration tube 61 and vibration arms 71 and 72 repeat simple harmonic oscillation to positive and negative deformed positions on both sides of the initial center position D. In addition, in FIGS; 47–50, the actual deformations are magnified for sake of clarity.

The vibration system described hereat prevents force components FY and FZ orthogonal to the orignual axis 66 caused by an oscillating force from oscillator 67 from being generated. This is done by limiting forces at fixed points 62, 63 at both ends of vibration tube 61 in a steady oscillated state to only torsional component ROTX around the original axis 66. The limitation is carried out by adjusting the mass distributions, shapes and stiffness of vibration tube 61 and vibration arms 71 and 72 and the distance between the arms 71, 72.

Figure 51:
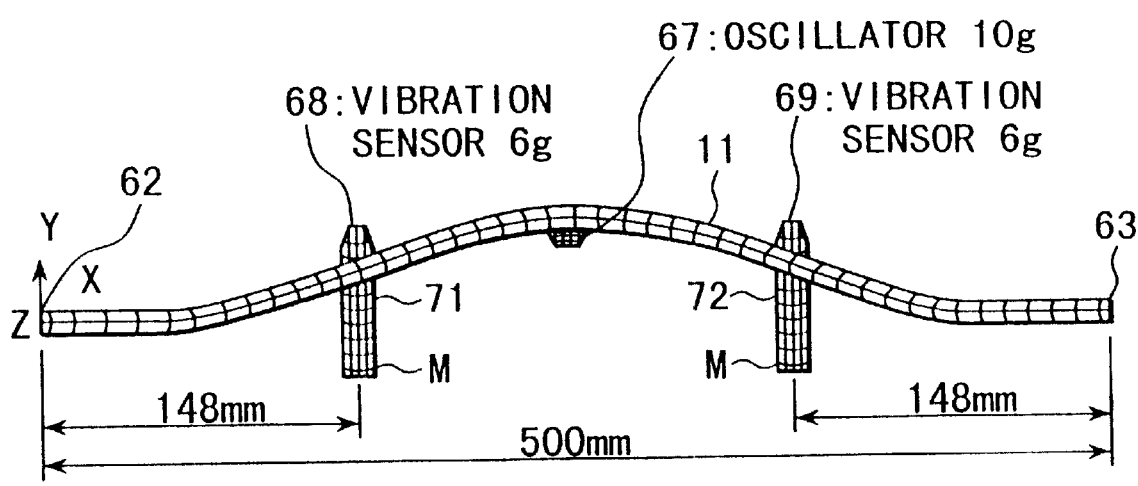
FIG. 51 is a view for explaining operation of the embodiment of FIG. 47 and is a front view in the Z direction.
Figure 52:
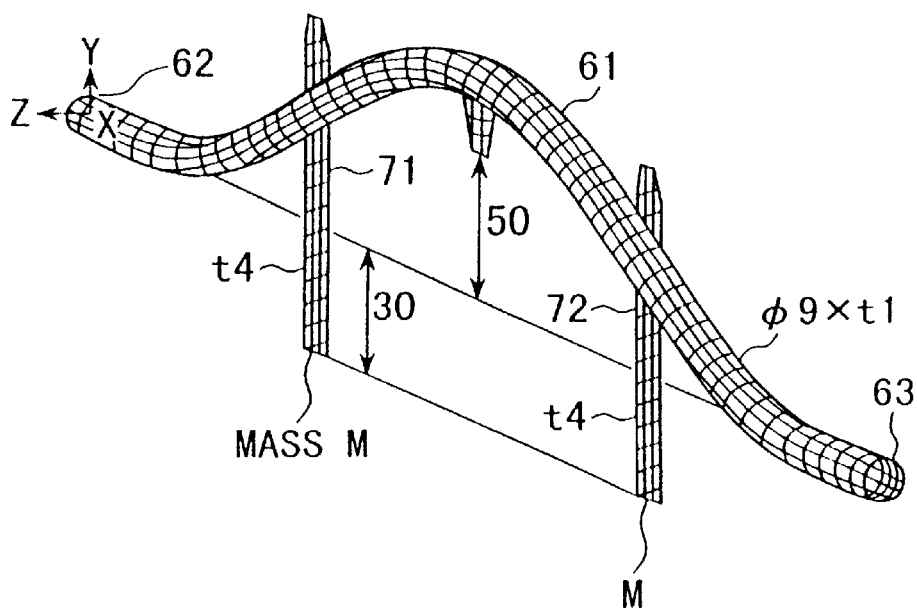
FIG. 52 is a perspective view for explaining operation of the embodiment of FIG. 47.

FIGS. 51 and 52 show a calculated model, wherein FIG. 51 is a front view of the model in the Z direction, and FIG. 52 is a perspective view of the model. The model is made of stainless steel and has the dimensions shown in FIGS. 51, 52. The total sum of forces in the Z direction applied to fixed points 62 and 63 at both ends are as follows:

$\Sigma FZ \approx 0.4$ kgf, for $M=32$ g $\Sigma FZ \approx 0.13$ kgf, for $M=33$ g $\Sigma FZ \approx 0$ kgf, for $M=33.5$ g That is to say, when masses of 33.5 g are provided at the tips of vibration arms 71 and 72, respectively, forces applied to the fixed points 62 and 63 at both ends are almost zero.

As a result, vibration cannot easily leak to the outside because transverse force components FY and FZ do not occur except for torsional component ROTX around the original axis 66 at the fixed points 62 and 63 located at both ends of the tube 61, in the steady excited state.

Rotating force around the original axis 66 can be strongly suppressed by housing 6 of the Coriolis mass flowmeter of the invention which has a far larger torsion stiffness compared with that of vibration tube 61. The torsion stiffness= $GIp=G\pi d^4/32$, that is stiffness increases proportional to the fourth power of the diameter.

The embodiment enjoys the following advantages, due to the enhanced isolation of vibration, as discussed for other embodiments:

1. A Coriolis mass flowmeter immune to external vibration noise is attained by the invention because the Q value of the internal vibration system can be made high, and even when external noise is applied, the influence of the external noise is relatively low and the vibration is stable.

2. Since stable excitation is implemented with less energy, a Coriolis mass flowmeter is attained by the which has low current consumption.

3. If dissipation of vibration energy to the outside changes or the dissipation between the upstream side and the downstream side of vibration tube 61 becomes unbalanced, the internal vibration system is affected and the zero and span are changed thereby. However, since the vibration is always confined internally by the invention, the foregoing influence or change can be disregarded, and a highly accurate Coriolis mass flowmeter is achieved by the invention.

Figure 53:
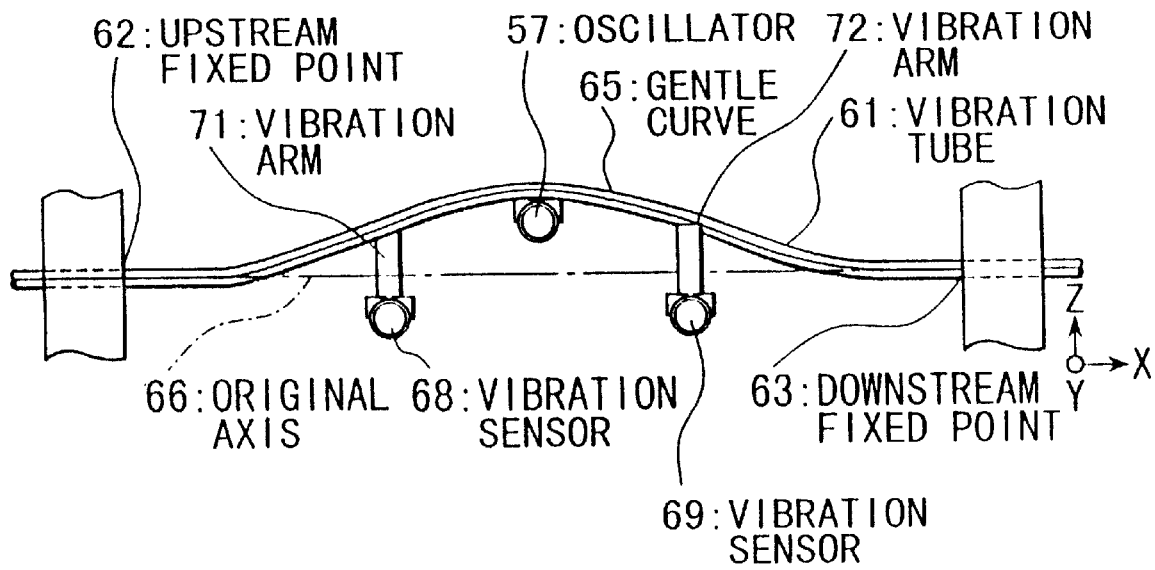
FIG. 53 is a view depicting an eighteenth illustrative embodiment of the invention.

FIG. 53 shows an eighteenth embodiment, wherein vibration sensors 68 and 69 are provided at other ends of vibration arms 71 and 72, respectively. By providing the sensors 68, 69 near the ends of the arms 71, 72 and on opposite side of the original axis 66 to tube 61, vibration can be detected at the optimum positions. Vibration can be measured at the largest amplitude locations in the vibration system by positioning the vibration sensors at the ends of the arms 71, 72. Also, the phase different generated in this embodiment by the Coriolis force becomes very large.

In point of fact, as a result of comparison of the embodiment hereat with the embodiment shown in FIG. 34, the following results are obtained as an example:

Ratio of sensor amplitude/driving amplitude is:
   0.8 for FIG. 34 embodiment and 3.5 for FIG. 53 embodiment.

Generated phase difference, in mrad, is:
   8.8 for FIG. 34 embodiment; 37.5 for FIG. 53 embodiment.

Thus, as shown, the values that are four times or more larger are observed for the FIG. 53 embodiment as for the FIG. 34 embodiment. As a result, the follwing advantages are attained by the invention:

1. If the measured amplitude is large, the S/N ratio is improved. On the other hand, if it is sufficient to obtain the measured amplitude at the same level as the conventional flowmeter, the oscillating force can be made smaller, and a Coriolis mass flowmeter can be achieved by the invention having a low power consumption. The smaller the maximum amplitude, the smaller the oscillation energy and the smaller the leakage to the outside. Thus, isolation of vibration becomes easier, and a Coriolis mass flowmeter can be achieved by the invention which is highly accurate and stable.

2. If the generated phase difference is large, signal processing in the signal conversion section becomes easy. Thus, a Coriolis mass flowmeter is attained by the invention which is highly accurate, stable, and uses simple and economical signal processing circuits. On the other hand, if signal processing performance equal to that of the prior art only is needed, a Coriolis mass flowmeter can be attained by the invention which can measure down to the low flow region where generated phase difference is small, or which can measure the mass flow of gases whose generated phase differences are originally small.

In this embodiment, since the amplitude and phase differences are four times or more higher than the conventional flowmeters, the invention has an outstanding advantage over the prior art. The degree of improvement is dramatic.

Figure 54:
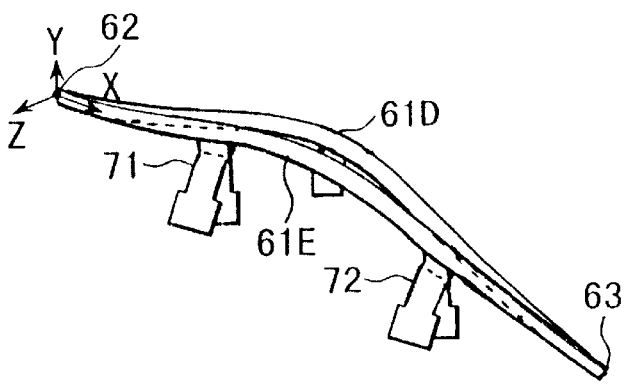
FIG. 54 is a perspective view depicting a nineteenth illustrative embodiment of the invention.
Figure 55:
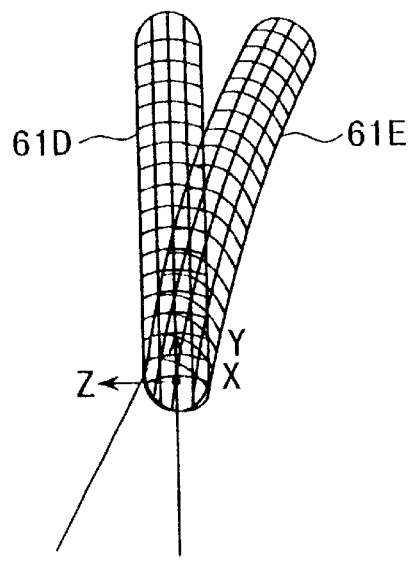
FIG. 55 is a projection diagram in the X direction of the embodiment of FIG. 54.
Figure 56:
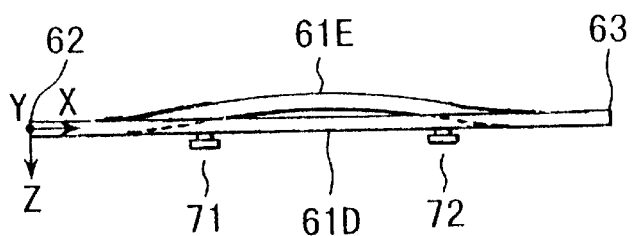
FIG. 56 is a projection diagram in the Y direction of the embodiment of FIG. 54.
Figure 57:
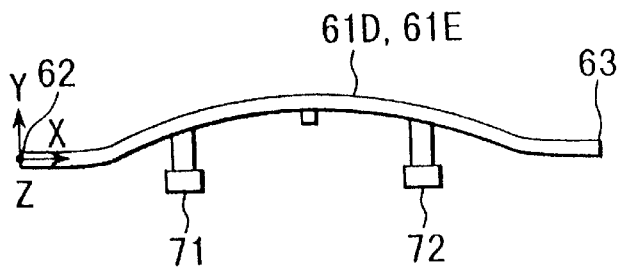
FIG. 57 is a projection diagram in the Z direction of the embodiment of FIG. 54.

FIGS. 54–57 show a nineteenth embodiment, wherein oscillator 67 oscillates vibration tube 61 in a second order or higher order oscillation mode. FIGS. 54–57 show results of modal analysis of the embodiment shown in FIG. 53 using the finite element method with shell elements. FIG. 54 is a perspective view of the embodiment. FIG. 55 is a projection drawing in the X direction of the embodiment of FIG. 54. FIG.56 is a projection drawing in the Y direction of the embodiment of FIG. 54. FIG. 57 is a projection drawing in the Z direction of the embodiment of FIG. 54. FIGS. 54–57 show two vibration tube shapes, namely, 61D in the initial position D, and 61E in the maximum deformed position E. These figures show the third order resonance states of the embodiment shown in FIG. 53, with the resonance frequency being 267 Hz. Normally, when the vibration system is self excited, the lowest order vibration mode is likely to be generated normally. However, in the invention of this embodiment, the vibration system is self excited so that the third order mode vibration is excited by adjusting the oscillator 67 to produce such third order mode.

A first order mode resonance frequency in the embodiment of FIG. 53 would be 153 Hz, and its vibration mode shape is as shown in FIGS. 58–61.

Figure 58:
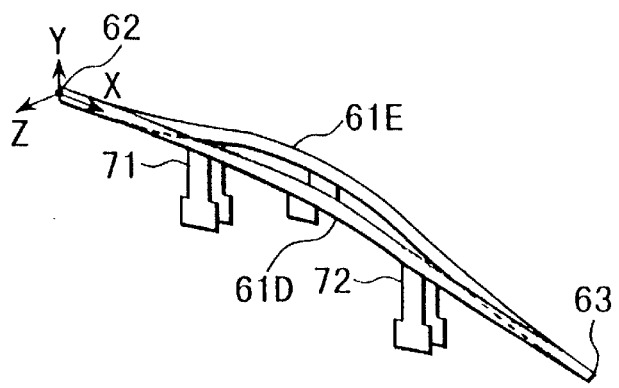
FIG. 58 is a perspective view for explaining operation of a first order oscillation mode in the embodiment of FIG. 53.
Figure 59:
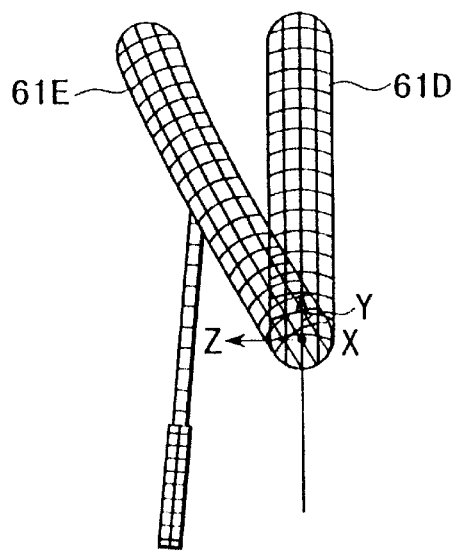
FIG. 59 is a projection diagram in the X direction of the embodiment of FIG. 58.
Figure 60:
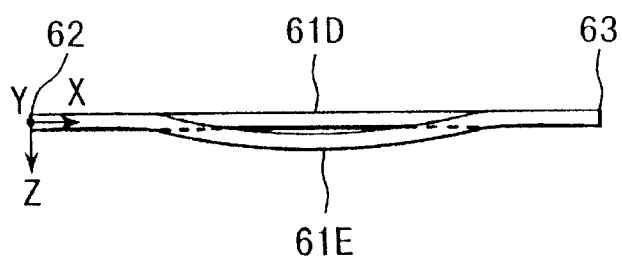
FIG. 60 is a projection diagram in the Y direction of the embodiment of FIG. 58.
Figure 61:
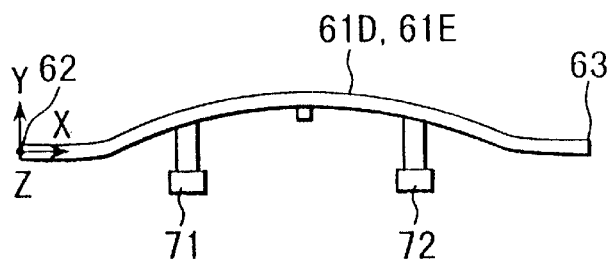
FIG. 61 is a projection diagram in the Z direction of the embodiment of FIG. 58.

FIG. 58 is a perspective view showing operation in the first order mode of the embodiment of FIG. 53. FIG. 59 is a projection drawing in the X direction of the embodiment of FIG. 58. FIG. 60 is a projection drawing in the Y direction of the embodiment of FIG. 58. FIG. 61 is a projection drawing in the Z direction of the embodiment of FIG. 58. FIGS. 58–61 show two vibration tube shapes, namely, 61D in the initial position D, and 61E in the maximum deformed position e. In these figures, the entire vibration system is deformed in the +Z direction. This is not the oscillation on a circuference. Since oscillating forces are directly applied to the fixed points 62 and 63, large forces in the X and Z directions are applied to these points.

Figure 62:
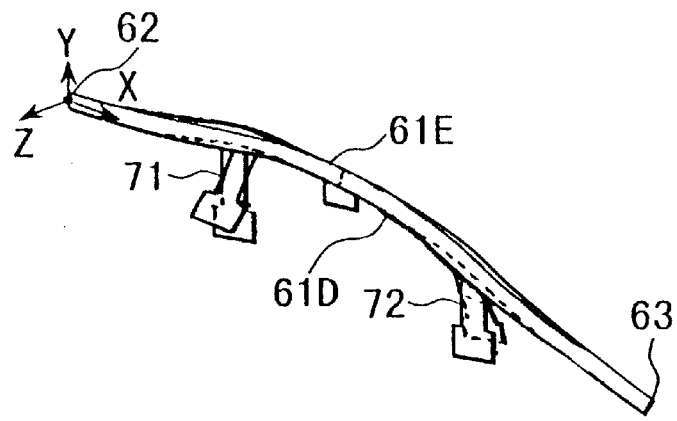
FIG. 62 is a perspective view for explaining operation in a second order oscillation mode in the embodiment of FIG. 53.
Figure 63:
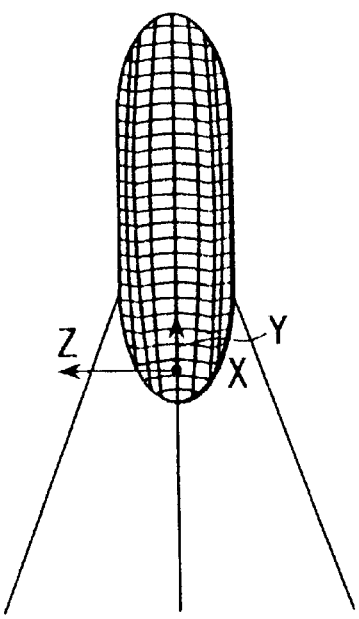
FIG. 63 is a projection diagram in the X direction of the embodiment of FIG. 62.
Figure 64:
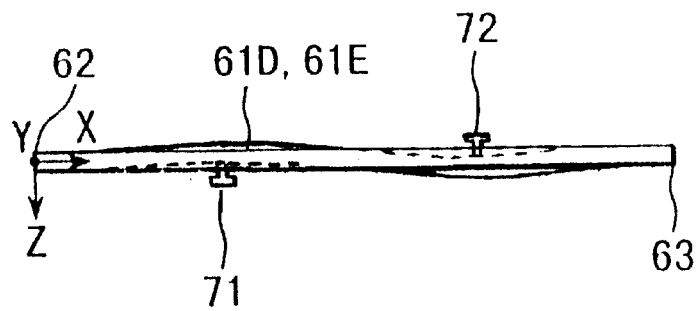
FIG. 64 is a projection diagram in the Y direction of the embodiment of FIG. 62.
Figure 65:
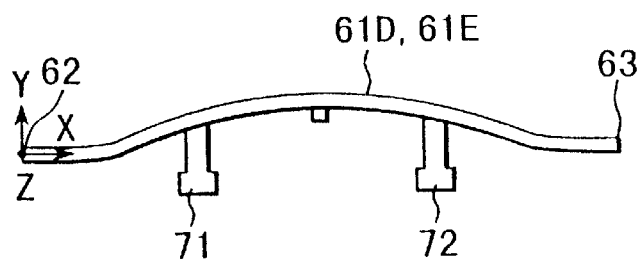
FIG. 65 is a projection diagram in the Z direction of the embodiment of FIG. 62.

The second order mode resonance frequency in the embodiment of FIG. 53 is 250 Hz, and its vibration mode shape is shown in FIGS. 62–65. FIG. 62 is a perspective view of a second order mode in the embodiment of FIG. 53. FIG. 63 is a projection drawing in the X direction of the embodiment of FIG. 62. FIG. 64 is a projection drawing in the Y direction of the embodiment of FIG. 62. FIG. 65 is a projection drawing in the Z direction of the embodiment of FIG. 62. FIGS. 62–65 show two vibration tube shapes, namely, 61D in the initial position D, and 61E in the maximum deformed position E. In these figures, deformation in the Z direction of tube 61 is reversed between the positive and negative values in the vicinity of the vibration tube center. Since deformation of tube 61 itself is small, generation of the Coriolis force is also small.

Figure 66:
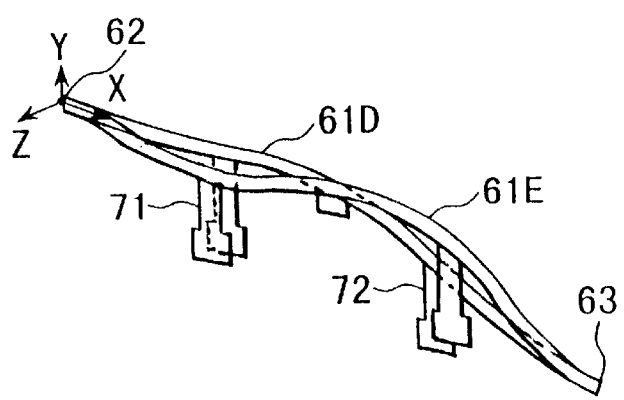
FIG. 66 is a perspective view for explaining operation in a fourth order oscillation mode in the embodiment of FIG. 53.
Figure 67:
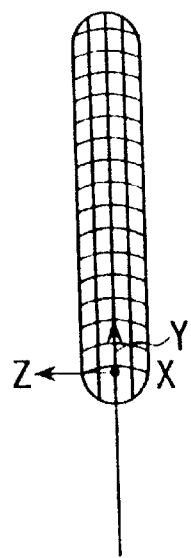
FIG. 67 is a projection diagram in the X direction of the embodiment of FIG. 66.
Figure 68:
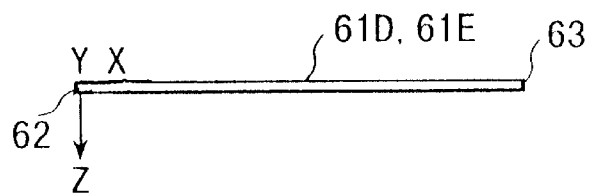
FIG. 68 is a projection diagram in the Y direction of the embodiment of FIG. 66.
Figure 69:
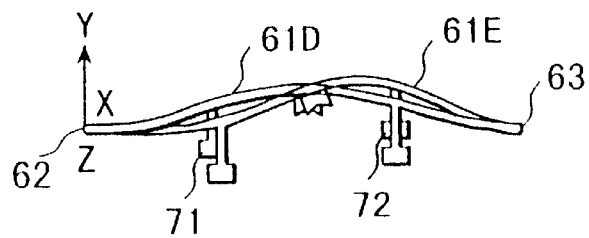
FIG. 69 is a projection diagram in the Z direction of the embodiment of FIG. 66.

The fourth order mode resonance frequency in the embodiment of FIG. 53 is 397 Hz and its vibration mode shape is as shown in FIGS. 66–69. FIG. 66 is a perspective view of the fourth order mode of the embodiment of FIG. 53. FIG. 67 is a projection drawing in the X direction of the embodiment of FIG. 66. FIG. 68 is a projection drawing in the Y direction of the embodiment of FIG. 66. FIG. 69 is a projection drawing in the Z direction of the embodiment of FIG. 66. These figures show two vibration tube shapes, namely, 61D in the initial position D, and 61E in the maximum deformed position E. In this embodiment, in FIGS. 66–69, although deformation of the tube takes a complex shape, the deformation does not affect the excitation mode in any substantial manner because the resonance frequency is high.

The foregoing discussion of excitation in the second order mode, third order mode, or higher order mode produces the following advantages:

1. It is easy in the invention to set the exciting frequency higher. Thus, a Coriolis mass flowmeter is achieved by the invention which is not easily affected by vibration noise occuring in high frequency excitation. The low frequency vibration may produce some field vibration noise; but, may be disregarded for practical usage.

2. Resonance frequencies in the excitation mode and in a vibration mode generated by the Coriolis force can be brought near to each other. In the FIG. 53 embodiment, the driving frequency is 267 Hz and is near to 250 Hz of the resonance frequency in the Coriolis approximation mode. In the following equation, sine P=1.068 and Q is 1000, the magnification factor G becomes large such as G=6.7, and the generated phase difference is also large, namely, where magnification factor $G=(1-P^2)/(1-p^2)2+(P/Q)$; and wherein P=(driving frequency)/(resonance frequency in Coriolis approx. mode).

3. If the generated phase difference is large, signal processing in the signal conversion section is easy. That is, a Coriolis mass flowmeter is attained by the invention which has a stable and highly accurate performance and uses only simple and economical signal processing circuits. On the other hand, if signal processing only equal to conventional signal processing is desired, a Coriolis mass flowmeter can be attained by the invention, which can measure down to the low flow region where generated phase differences are small, and which can measure the mass flow of a gas whose phase difference is originally small. The stability of the invention flowmeter is also greatly improved.

Figure 70:
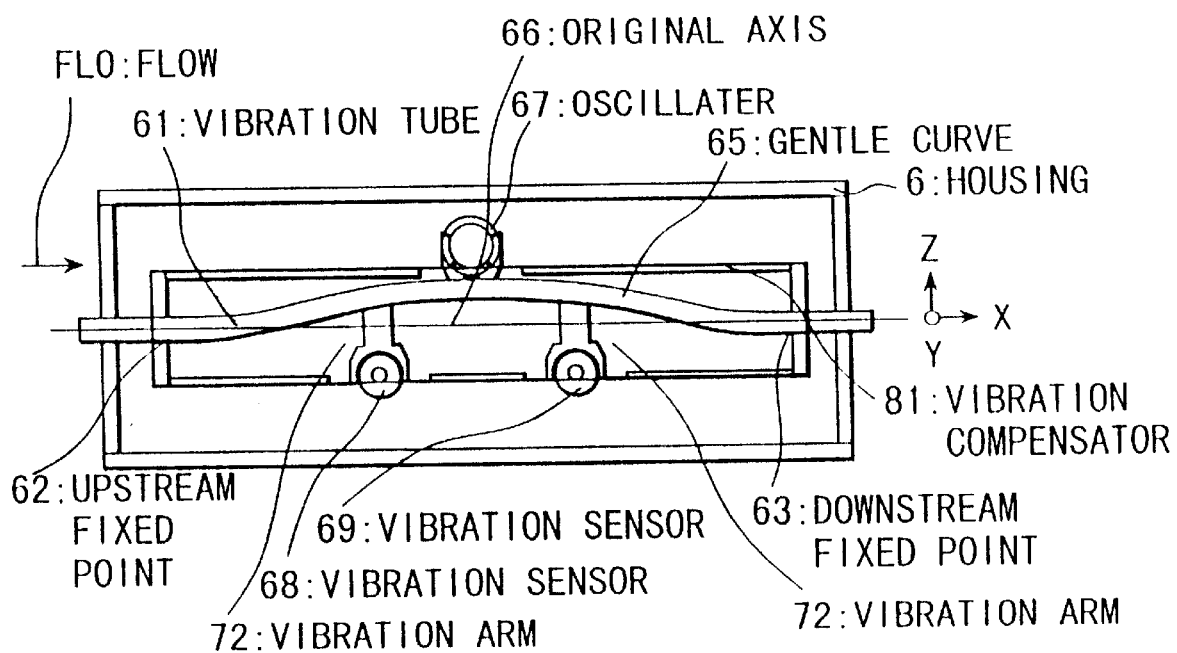
FIG. 70 is a cross sectional top view depicting a twentieth illustrative embodiment of the invention.
Figure 71:
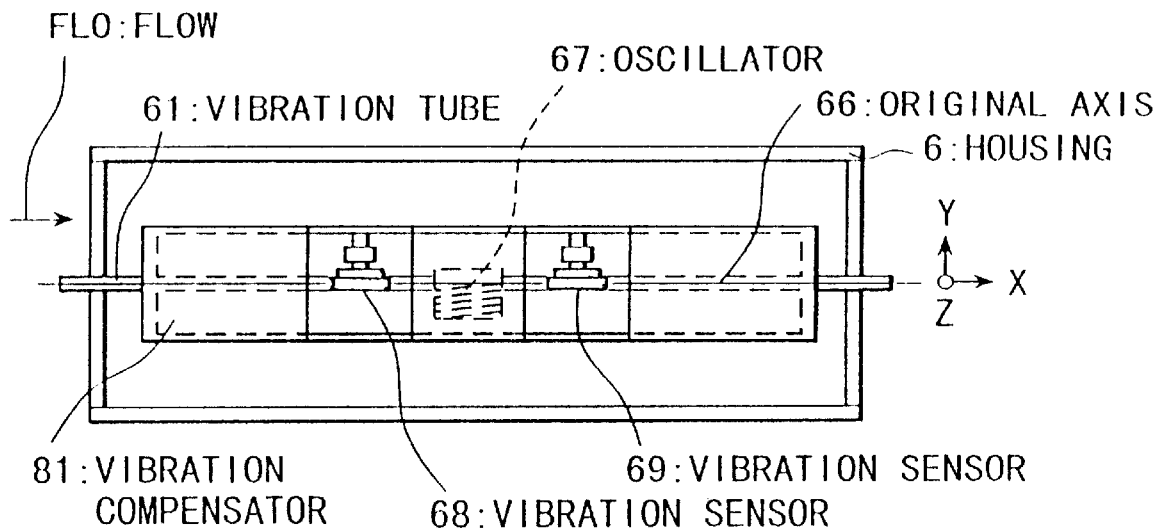
FIG. 71 is a cross sectional front view of the embodiment of FIG.70.
Figure 72:
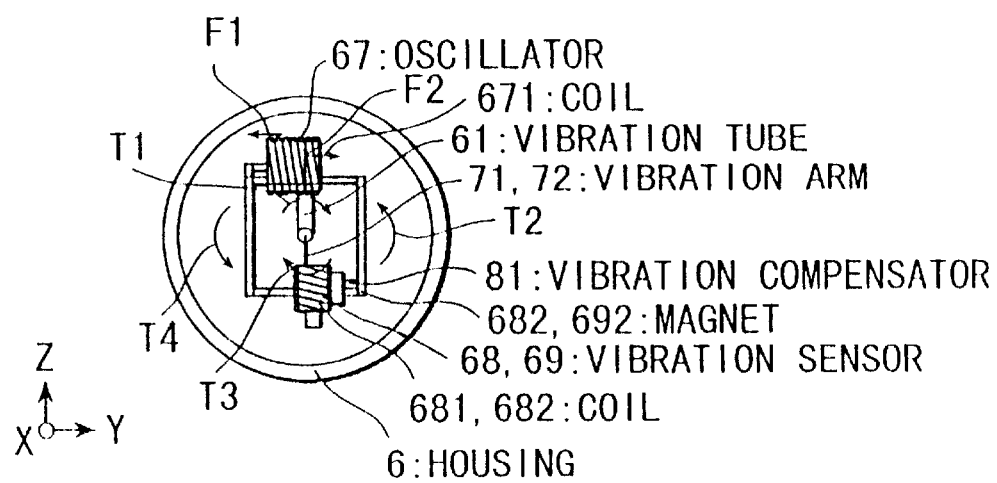
FIG. 72 is a cross sectional side view of the embodiment of FIG. 70.

FIGS. 70–72 show a twentieth embodiment, wherein FIG. 70 is a plan view of the embodiment, FIG. 71 is a front view thereof, and FIG. 72 is a side view thereof, and wherein vibration compensator 81 is provided inside housing 6. In vibration compensator 81, vibration tube 61 oscillator 67, and vibration sensors 68, 69 are provide. FIG. 72 shows an example wherein coils 671, 681, 691, and magnets 672, 682, 692, are used for oscillator 67 and vibration sensors 68 and 69. The vibration compensator 81 is provided in parallel with the original axis 66 with the length in the parallel direction, and both its ends being fixed to and supported by the ends of the vibration tube 61.

In the embodiment, as shown in FIG. 72, coil 671 and magnet 672 repel each other with forces $F_1$ and $F_2$ when oscillator 67 is actuated. With these forces, vibration tube 61 and vibration arms 71, 72 are rotated clockwise in FIG. 72 taking the vicinity of the orignal axis as the center as shown by $T_1$ and $T_3$. The vibration compensator 81 is rotated counterclockwise, counter to the rotation of tube 61 and arms 71, 72, as shown by $T_2$ and $T_4$, by the reactive forces of, those described above.

Since vibration tube 61 is connected with vibration compensator 81, the clockwise forces and counterclockwise forces cancel out each other at fixed points 62 and 63 which are joined parts. This reduces such force components around the original axis, and is such that the rotating component around the original axis 66 does not leak out from vibration compensator 81. Since the vibration compensator 81 is provided in housing 6, vibration tube 61, vibration arms 71 and 72, vibration sensors 68 and 69, are acted on by forces in the opposite direction of forces which act on compensator 81, via oscillator 67. That is, inversely rotating vibrations are generated around the original axis 66.

At the fixed points 62 and 63, wherein tube 61 and compensator 81 are joined, the forces opposite to each other act and cancel out each other, thereby forming the node of vibration at these points. In such a manner, since not only the transverse component, but also the rotating component around the original axis 66, can be suppressed, isolation of the vibration can be further enhanced. Such enhanced isolation of vibration produces the following advantages:

1. A Coriolis mass flowmeter immune to external vibration noise is attained by the invention because the Q value of the internal vibration system can be made high, and even when external noise is applied, the influence of the noise is relatively low and the vibration is stable.

2. Since stable excitation is implemented with less energy, a Coriolis mass flowmeter is attained by the invention which has low current consumption.

3. If dissipation of vibration energy to the outside changes or the dissipation between the upstream side and the downstream side becomes unbalanced, the internal vibration system is affected and the zero and span are changed thereby. Since vibration is always confined internally in the invention, the foregoing influence or change is not of undue concern. Thus, a highly accurate Coriolis mass flowmeter is attained by the invention.

4. Internal vibration can be stable excitation by supporting the vibration system with the vibration compensator 81, even if stresses are applied from the outside. That is, a stable and accurate Coriolis mass flowmeter is attained by the invention which is not easily affected by piping stresses and/or thermal stresses.

Figure 73:
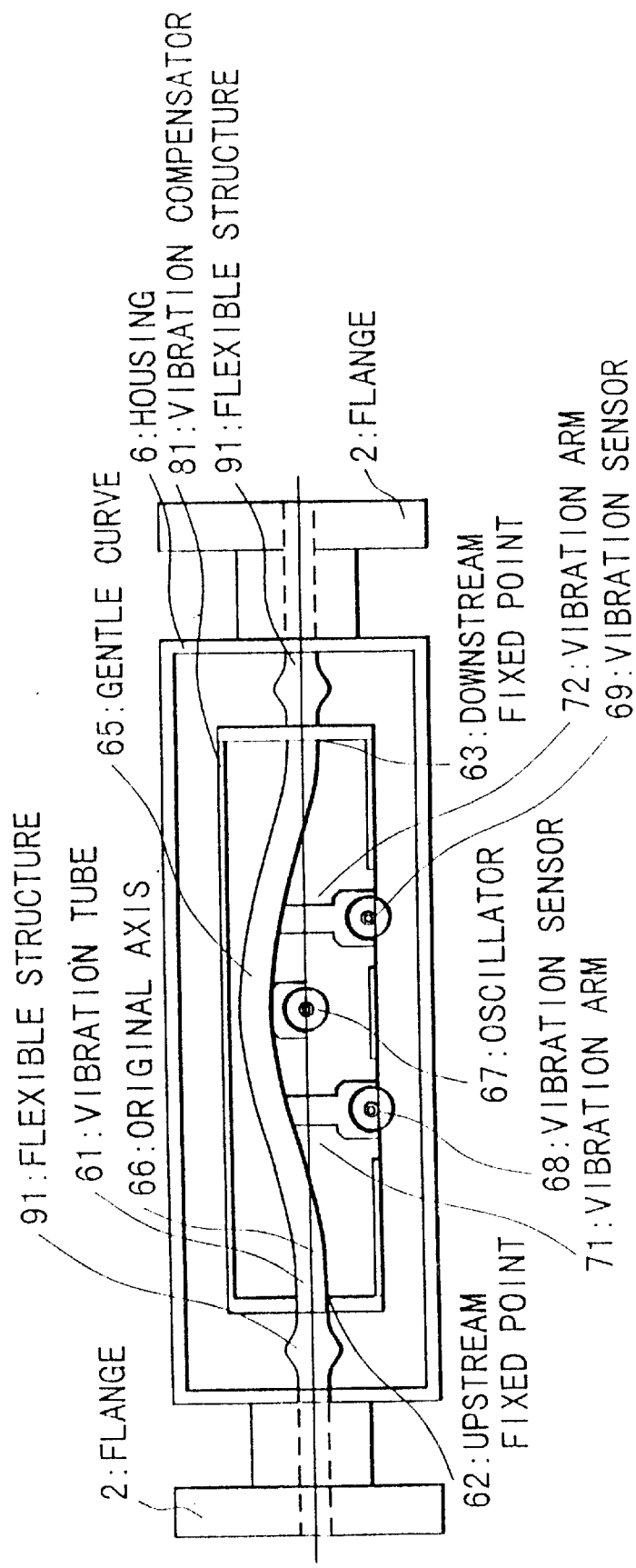
FIG. 73 is a cross sectional view depicting a twenty first illustrative embodiment of the invention.

FIG. 73 shows a twenty first embodiment wherein flexible structures 91 are provided which absorb expansion or contraction in the direction of and rotational vibration around the original axis 66 and are provided at parts of the tube 61 between the upstream fixed point 62 and the upstream flange 2, and between the downstream fixed point 63 and the downstream flange 2. As a result the following advantages are attained by the invention:

1. Absorption of thermal expansion is made possible. Thus, a Coriolis mass flowmeter is achieved by the invention which is stable over a wide range of temperatures and which is highly accurate.

2. Even if piping stress is applied, flexible structures 91 can absorb the stress and prvent the stress from affecting the inside of the flowmeter. Accordingly, the invention attains a highly accurate and stable Coriolis mass flowmeter.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A Coriolis mass flow meter comprising:
   a vibration tube through which a measuring fluid is transmitted, said vibration tube providing a gentle curve and being line-symmetrical about a center line equidistant from an upstream fixed point and a downstream fixed point of said vibration tube with an axis being taken as a straight line connecting said upstream fixed point with said downstream fixed point, said vibration tube being operated by deforming and vibrating said vibration tube by using a Coriolis force generated by flow of said measuring fluid and angular vibration of said vibration tube; wherein
   said vibration tube performs simple harmonic oscillation or circular motion on circumferences away from each point of said axis at predetermined distances; and
   at least two vibration arms disposed crossing orthogonal to said axis or said vibration tube, one end of each or said at least two vibration arms being fixed to said vibration tube and the other end of each of said at least two vibration arms being disposed to be symmetrical about said center liner; wherein
   an oscillation or circular motion component orthogonal to said axis is prevented from being generated by making a force generated at both fixed points of said vibration tube in a steady excited state be only a torsional component around said axis, by adjustment of mass distribution, shape, and stiffness of said vibration tube and said at least two vibration arm, and by adjustment of distance between said at least two vibration arms.

2. The flow meter of claim 1, further comprising:
   a vibration sensor provided on each of said at least two vibration arms.

3. The flow meter of claim 1, wherein said simple harmonic or circular motion is provided by oscillation means mounted at predetermined angles around said axis in a non-contact manner with said vibration tube.

4. The flow meter of claim 3, wherein said oscillation means operates to excite said vibration tube in a second order or higher oscillation mode.

5. The flow meter of claim 1, wherein said oscillation or circular motion component is prevented from being generated by a plurality of compensation means.

6. The flow meter of claim 5, wherein said stiffness is adjusted by a structure joined to said two fixed points of said vibration tube.

7. The flow meter of claim 6, wherein said structure is disposed parallel to said axis; and wherein said simple harmonic or circular motion is provided by oscillation means; and wherein one or more sensors are provided between said plurality of compensation means and said vibration tube.

8. The glow meter of claim 7, wherein means are provided for absorbing expansion or contraction of said vibration tube in an axial direction or in a radial direction.

9. A Coriolis mass flow meter comprising:
   a vibration tube through which a measuring fluid is transmitted, said vibration tube providing a gentle curve and being line symmetrical about a center line equidistant from an upstream fixed point and a downstream fixed point of said vibration tube with an axis being taken as a straight line connecting said upstream fixed point with said downstream fixed point, said vibration tube being operated by deforming and vibrating said vibration tube by using a Coriolis force generated by flow of said measuring fluid and angular vibration of said vibration tube; wherein
   said vibration tube performs simple harmonic oscillation or circular motion on circumferences away from each point of said axis at predetermined distnaces; and
   at least one vibration arm disposed crossing orthogonal to said axis or said vibration tube, one end of said at least one vibration arm being fired to said vibration tube and another end or said at least one vibration arm being disposed on an opposite side of said vibration tube from said axis; wherein
   a center of gravity of the entire vibration system is placed on said axis by adjusting mass distribution and shape of said vibration tube and said at least one vibration arm.

10. The flow meter of claim 9, further comprising:
    a vibration sensor provided on said at least one vibration arm.

11. The flow meter of claim 9, wherein said simple harmonic or circular motion is provided by oscillation means mounted at predetermined angles around said axis in a non-contact manner.

12. The flow meter of claim 11, wherein said oscillation means operates to excite said vibration tube in a second order or higher oscillation mode.

13. A Coriolis mass flow meter comprising:
a vibration tube through which a measuring fluid in transmitted, said vibration tube providing a gentle curve and being line symmetrical about a center line equidistant from an upstream fixed point and a downstream fixed point of said vibration tube with an axis being taken alma straight line connecting said upstream fixed point with said downstream fixed point, said vibration tube being operated by deforming and vibration said vibration tube by using a Coriolis force generated by flow of said measuring fluid and angular vibration of said vibration tube; wherein
said vibration tube performs simple harmonic oscillation or circular motion on circumferences away from each point of said axis at predetermined distances; and
at least two vibration arms disposed crossing orthogonal to said axis or said vibration tube, one end of each of said at least two vibration arms being fixed to said vibration tube and the other end of each of said at least two vibration arms being disposed to be symmetrical about said center line; wherein
a center of gravity of the entire vibration system is placed in a position of a vibration node by adjusting mass distribution. shape and stiffness of said vibration tube and said at least two vibration arms and by adjusting distance between said at least two vibration arms.

14. The flow meter of claim 13, further comprising:
a vibration sensor provided on each of said at least two vibration arms.

15. The flow meter of claim 13, wherein said simple harmonic or circular motion is provided by oscillation means mounted at predetermined angles around said axis in a non-contact manner with said vibration tube.

16. The flow meter of claim 15, wherein said oscillation means operates to excite said vibration tube in a second order or higher oscillation mode.

* * * * *